US010904775B2

(12) United States Patent
Yaghmour et al.

(10) Patent No.: US 10,904,775 B2
(45) Date of Patent: Jan. 26, 2021

(54) METHODS AND SYSTEMS FOR INCREASING BANDWIDTH EFFICIENCY IN SATELLITE COMMUNICATIONS

(71) Applicant: Intelsat US LLC, Mclean, VA (US)

(72) Inventors: Salim M K Yaghmour, Alexandria, VA (US); Virgil Marvin Bernard Cannon, Whittier, CA (US)

(73) Assignee: Intelsat US LLC, McLean, VA (US)

( * ) Notice: Subject to any disclaimer, the term of this patent is extended or adjusted under 35 U.S.C. 154(b) by 0 days.

(21) Appl. No.: 16/726,392

(22) Filed: Dec. 24, 2019

(65) Prior Publication Data

US 2020/0154289 A1 May 14, 2020

Related U.S. Application Data

(63) Continuation of application No. 16/448,717, filed on Jun. 21, 2019, now Pat. No. 10,554,471, which is a (Continued)

(51) Int. Cl.
*H04W 4/00* (2018.01)
*H04B 7/185* (2006.01)
(Continued)

(52) U.S. Cl.
CPC .......... *H04W 24/02* (2013.01); *H04B 1/1027* (2013.01); *H04B 1/66* (2013.01);
(Continued)

(58) Field of Classification Search
CPC .. H04B 7/185; H04B 7/1851; H04B 7/15528; H04B 7/18508; H04B 7/18513;
(Continued)

(56) References Cited

U.S. PATENT DOCUMENTS 3,499,995 A 3/1970 Clark
4,450,582 A 5/1984 Russell
(Continued)

FOREIGN PATENT DOCUMENTS

EP 0 732 814 A2 9/1996
WO WO 2014/159667 A1 2/2014

OTHER PUBLICATIONS

Katsuhiko Kawazoe, Keiko Kikuchi, and Noboru Takizawa, "ATM Multiplex for Multimedia Satellite Communication System", NTT Service Integration Laboratories, 3-9-11, Midori-cho, Musashino-shi, Tokyo 180-8585, Japan, 2001, pp. 2779-2783.
(Continued)

*Primary Examiner* — Quochien B Vuong
(74) *Attorney, Agent, or Firm* — Finnegan, Henderson, Farabow, Garrett & Dunner, LLP

(57) ABSTRACT

Methods and systems are provided for increasing bandwidth efficiency in satellite communications. In some embodiments, a satellite communications method is provided that comprises receiving, at a satellite and from a plurality of user ground terminals, a plurality of source signals, wherein each of the source signals are modulated according to at least one source modulation method, and further receiving, at a satellite and from a plurality of user ground terminals, a plurality of information signals corresponding to the plurality of source signals. The method further includes combining, at the satellite, the plurality of source signals into a combined source signal with an overlapping bandwidth, wherein each of the source signals are further modulated according to at least one predetermined modulation method before they are combined, and transmitting, by a downlink transmission from the satellite to a gateway ground station, the combined source signal.

23 Claims, 14 Drawing Sheets

Related U.S. Application Data continuation of application No. 16/179,685, filed on Nov. 2, 2018, now Pat. No. 10,382,984.

(60) Provisional application No. 62/580,955, filed on Nov. 2, 2017.

(51) Int. Cl.

| | | |
|---|---|---|
| *H04W 24/02* | (2009.01) | |
| *H04L 27/34* | (2006.01) | |
| *H04B 1/66* | (2006.01) | |
| *H04W 88/16* | (2009.01) | |
| *H04B 1/10* | (2006.01) | |
| *H04H 20/42* | (2008.01) | |
| *H04H 20/51* | (2008.01) | |
| *H04H 20/74* | (2008.01) | |
| *H04L 1/00* | (2006.01) | |
| *H04H 40/90* | (2008.01) | |
| *H04W 84/06* | (2009.01) | |

(52) U.S. Cl.
CPC ..... *H04B 7/18513* (2013.01); *H04B 7/18515* (2013.01); *H04B 7/18517* (2013.01); *H04H 20/423* (2013.01); *H04H 20/51* (2013.01); *H04H 20/74* (2013.01); *H04L 27/3405* (2013.01); *H04W 88/16* (2013.01); *H04B 2001/1054* (2013.01); *H04H 40/90* (2013.01); *H04L 1/0003* (2013.01); *H04L 1/0009* (2013.01); *H04W 84/06* (2013.01)

(58) Field of Classification Search
CPC ............ H04B 7/18515; H04B 7/18517; H04B 7/18526; H04B 7/18528; H04B 7/18578; H04B 7/18582; H04W 24/02; H04W 28/16; H04W 84/06; H04W 88/16

See application file for complete search history.

(56) References Cited

U.S. PATENT DOCUMENTS

| | | |
|---|---|---|
| 5,680,388 A | 10/1997 | Kåhre |
| 6,198,730 B1 | 3/2001 | Hogberg et al. |
| 6,317,583 B1 | 11/2001 | Wolcott et al. |
| 6,574,707 B2 | 6/2003 | Shaw |
| 6,574,794 B1 | 6/2003 | Sarraf |
| 6,892,068 B2 | 5/2005 | Karabinis et al. |
| 6,944,450 B2 | 9/2005 | Cox |
| 7,002,918 B1 | 2/2006 | Prieto, Jr. et al. |
| 7,027,769 B1 | 4/2006 | Rosen et al. |
| 7,292,547 B1 | 11/2007 | Godwin et al. |
| 7,920,643 B2 * | 4/2011 | Chen ............... H04H 20/30 375/295 |
| 7,970,345 B2 | 6/2011 | Cummiskey et al. |
| 8,165,578 B2 | 4/2012 | Singh |
| 8,180,391 B2 | 5/2012 | Fujii |
| 8,259,857 B2 | 9/2012 | Dybdal |
| 8,660,481 B2 | 2/2014 | Miller |
| 8,693,970 B2 * | 4/2014 | Corman ............... H04B 7/10 455/276.1 |
| 8,767,845 B2 | 7/2014 | Kumar |
| 9,276,665 B1 * | 3/2016 | Johnson ............ H04W 84/06 |
| 10,135,520 B2 * | 11/2018 | Lemme ............... H04B 7/19 |
| 10,243,648 B2 | 3/2019 | Wyler |
| 2010/0097932 A1 | 4/2010 | Wu |
| 2017/0085411 A1 | 3/2017 | Noerpel et al. |
| 2017/0135108 A1 | 5/2017 | Hong et al. |

OTHER PUBLICATIONS

International Search Report and the Written Opinion of the International Searching Authority (PCT/US2018/059069) dated Feb. 18, 2019 (13 pages).

International Search Report and the Written Opinion of the International Searching Authority (PCT/US2018/059081) dated Feb. 18, 2019 (13 pages).

* cited by examiner

150

METHODS AND SYSTEMS FOR INCREASING BANDWIDTH EFFICIENCY IN SATELLITE COMMUNICATIONS

CROSS REFERENCE TO RELATED APPLICATION(S)

This application is a continuation of U.S. application Ser. No. 16/448,717 (now allowed), filed Jun. 21, 2019, which is a continuation of U.S. application Ser. No. 16/179,685), filed Nov. 2, 2018 (now U.S. Pat. No. 10,382,984), which claims the benefit of priority to U.S. Provisional Application No. 62/580,955, filed Nov. 2, 2017. All of the foregoing applications are incorporated herein by reference in their entirety.

FIELD OF THE INVENTION

The present disclosure generally relates to satellite communication systems and methods. More particularly, and without limitation, the present disclosure relates to systems and methods for increasing the bandwidth efficiency in satellite communication systems.

BACKGROUND

Satellite communication systems relay signals between user ground terminals and gateway ground stations over channels consisting of a range of frequencies. For most coverage areas, the available frequency spectrum or bandwidth for uplink and downlink satellite transmissions is a limited resource. The growing demand for satellite communications has thus increased the need for higher levels of bandwidth efficiency, which can provide the benefits of increasing capacity in a given bandwidth and reducing pricing to satellite users.

Uplink and downlink transmissions between satellites and terrestrial stations may occur through the use of multiple regional beams and/or spot beams. Examples of beam coverage areas are shown in FIGS. 9 and 10, which illustrate examples of spot beams and regional beams, respectively. Regional beams are wide beams that serve a broader area and do not require precise directionality to receiving dishes. For example, a regional beam might serve the continental United States. A spot beam, in contrast, is spectrally concentrated in power to cover a specific, limited geographic area. Spot beams may have radii of, for example, 300 or 500 miles. Often, neighboring spot beams are clustered to serve a larger geographic area where the size of the spot beam may be determined by factors such as a threshold for loss. For example, the radius of the spot beams may be sized according to locations that experience a 3 dB to 7 dB loss relative to the central portion of the beam that experiences maximum gain.

Neighboring spot beams suffer from mutual interference near their shared boundaries, and this interference can compound problems relating to limited bandwidth in satellite transmissions because the interference constrains choice of bandwidth in one spot beam based on its neighboring spot beam. Methods of frequency assignment that involve reusing and/or sharing a portion of the frequency spectrum between satellite spot beams have been proposed to address the problem of interference and accompanying inefficiencies in bandwidth usage.

In addition, satellite communications require transmissions over designated uplink and downlink channels. Each satellite channel is a spectrum of frequencies. Commonly used frequency bands for satellite communications include L-band (1-2 GHz), S-band (2-4 GHz), C-band (4-8 GHz), Ku-band (12-18 Ghz), and Ka-band (18-27 GHz). Often, the lower portion of each band is dedicated to downlink channels, wherein the transmission is sent from a satellite to the ground, while the upper portion of each band is dedicated to uplink channels, wherein the transmission is sent from terrestrial stations to the satellite. To transmit data within a band, source signals are combined with carrier waves whose frequency is within the band and, more particularly, within a channel.

One method of increasing bandwidth efficiency in satellite communications is to modulate individual source signals prior to transmission. For example, Digital Video Broadcasting (DVB) is a family of standards for modulating source signals in satellite broadcasting. DVB standards include the DVB-S2 and DVB-S2X standards, which provide data framing structures, channel coding, and modulation for combining individual source signals with common carrier transmit signals. DVB standards may involve MPEG compression of data signals for more efficient bandwidth use.

An additional approach to increasing bandwidth efficiency that may be used in combination with modulation methods like DVB-S2 is to combine source signals during transmission. DVB standards are designed to carry single or multiple compressed MPEG streams (signals) in a single satellite transmission, i.e., to transmit multiple source signals on overlapping channels, which results in more efficient use of the available bandwidth.

A number of methods for modulating signals in satellite communications networks are known in the field. For example, signals may be transmitted using Frequency Division Multiple Access (FDMA), Time Division Multiple Access (TDMA), and/or other modulation methods. In FDMA, all users share a channel comprising a frequency spectrum, but each transmits at a specific subset of the frequency spectrum within a channel. In TDMA, multiple users share the same channel by transmitting in short bursts alternating with other users. In an example variant of FDMA, Orthogonal Frequency-Division Multiplexing (OFDM), closely neighboring channels and sub-channels are polarized to be orthogonal to one another, decreasing signal interference. Amplitude Phase Shift Keying (APSK) is another example modulation method, in which the phase and amplitude of a carrier wave are modulated between a finite set of specific amplitudes and phase shifts to transmit information in a source signal.

Traditional two-carrier channel sharing or carrier-in-carrier channel sharing represents another approach to increasing bandwidth or spectral efficiency, wherein a shared, overlapping bandwidth is used for uplink and downlink transmissions. Cancellation at both ends of a communication link involves providing an estimate or copy of the undesired transmitted signal to extract the desired received signal from the received combined signal.

The above-mentioned techniques suffer from a number of drawbacks, including limitations on bandwidth efficiency and combining multiple signals into overlapping channels due to interference. For example, TDMA and other such methods do not involve overlapping channels. Also, channels in FDMA are not overlapping but adjacent, as an overlap using an FDMA-based technique can give rise to signal interference. Furthermore, approaches that involve overlapping signals, like carrier-in-carrier channel sharing, require access to the original source signals to cancel undesired signals and accurately extract desired signals.

This typically limits the overlapping signals to share the same uplink and downlink beam.

SUMMARY

Embodiments of the present disclosure provide systems and methods for increasing bandwidth efficiency in satellite communications. In accordance with some embodiments of the present disclosure, systems and methods are provided that combine two or more source signals into overlapping frequencies for uplink or downlink transmission in a satellite communications network. The source signals may be combined either on the ground or on-board a satellite.

In some embodiments, a combined information signal is also transmitted in the uplink or downlink transmission with the combined source signal. The combined information signal may include information specifying the modulation method to modulate the source signals that are included in the combined source signal. The combined information signal may also include other information, such as the source modulation type and error correction code type related to each source signal.

In accordance with an embodiment of the present disclosure, a system for providing bandwidth efficiency in satellite communications is provided. The system may include one or more receiving antennas at a satellite. The receiving antennas may receive, from a plurality of user ground terminals, a plurality of source signals, wherein each of the source signals are modulated according to at least one source modulation method; and a plurality of information signals corresponding to the plurality of source signals. The system may include one or more digital signal processors that combine, at the satellite, the plurality of source signals into a combined source signal with an overlapping bandwidth. Each of the source signals may further be modulated according to at least one predetermined modulation method before they are combined. The system may include one or more transmitting antennas that transmit, by a downlink transmission from the satellite to a gateway ground station, the combined source signal. The downlink transmission may comprise information specifying a predetermined modulation method.

In accordance with another embodiment of the present disclosure, a method for providing bandwidth efficiency in satellite communications is provided. The method may include receiving, at a satellite and from a plurality of user ground terminals, a plurality of source signals. Each of the source signals may be modulated according to at least one source modulation method. The method may also comprise further receiving, at the satellite and from the plurality of user ground terminals, a plurality of information signals corresponding to the plurality of source signals. In addition, the method may include combining, at the satellite, the plurality of source signals into a combined source signal with an overlapping bandwidth. Each of the source signals may be further modulated according to at least one predetermined modulation method before they are combined. The method may also comprise transmitting, by a downlink transmission from the satellite to a gateway ground station, the combined source signal, wherein the downlink transmission comprises information specifying the at least one predetermined modulation method.

In accordance with still other disclosed embodiments, non-transitory computer readable storage media may store program instructions, which are executed by at least one processor device and perform any of the methods described herein.

As further disclosed herein, systems and methods consistent with the present disclosure may be implemented using a combination of conventional hardware and software, as well as specialized hardware and software, such as a device or other apparatus constructed and/or programmed specifically for performing functions associated with the disclosed method steps.

BRIEF DESCRIPTION OF DRAWINGS

The accompanying drawings, which are incorporated in and constitute part of this specification, and together with the description, illustrate and serve to explain the principles of various exemplary embodiments related to the present disclosure.

DETAILED DESCRIPTION

Figure 1:
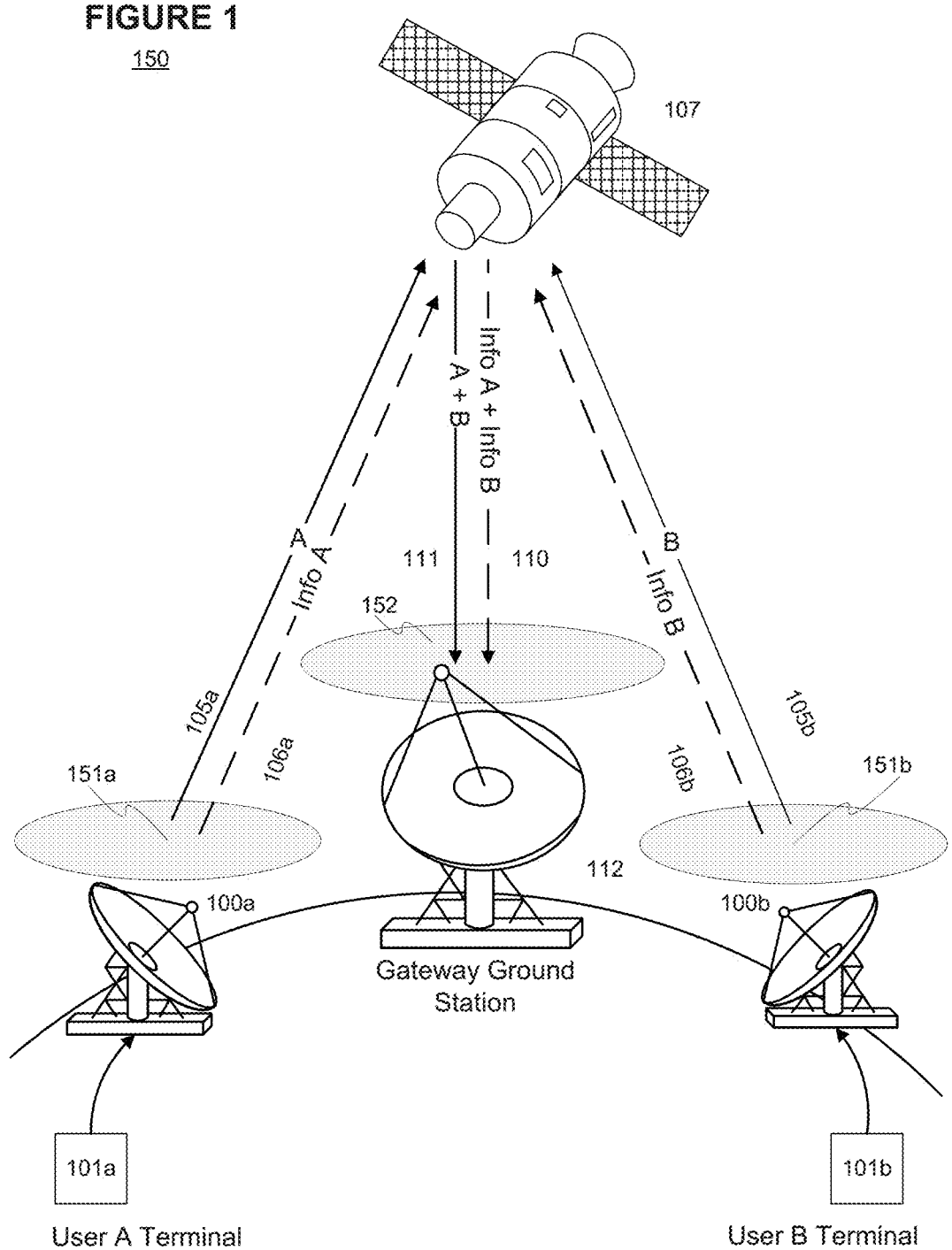
FIG. 1 illustrates an example satellite communications system wherein signals are separately transmitted on uplink but combined on downlink.

Embodiments of the present disclosure provide systems and methods for increasing bandwidth efficiency in satellite communications. Embodiments of the present disclosure combine two or more source signals of satellite users into overlapping frequencies for uplink or downlink transmission in a satellite communications network. To combine source signals, one or more (i.e., "a set of") digital signal processors (DSPs) may be utilized. For example, to combine source signals for a downlink transmission, a set of DSPs may be provided on-board a satellite. For an uplink transmission, a set of DSPs may be provided at a gateway ground station. In both cases, a set of DSPs may also be provided at the corresponding end of transmission to process and separate out the source signals from the combined source signal.

In some embodiments, a combined information signal is also transmitted in the uplink or downlink transmission with the combined source signal. The combined information signal includes information specifying the modulation method to modulate the source signals that are included in the combined source signal. The combined information signal also includes other information, such as the source modulation type and error correction code type related to each source signal. In some embodiments, each source signal may have a corresponding information signal. The combined information signal may be generated based on the information in the corresponding information signals, which are originally transmitted or provided with the individual source signals. When the source signals are combined into an overlapping bandwidth, the combined information signals may also be generated and included as part of an uplink or downlink transmission with the combined source signal (e.g., as part of a sub-channel or an adjacent or neighboring channel).

Combined source and information signals may be processed at a receiving end of an uplink or downlink transmission to extract the original signals. In some embodiments, a set of DSPs at the receiving end of the link may respectively cancel out component source signal(s) to extract and demodulate the desired source signal(s). By using the information in the information signal(s), waveform estimation and signal extraction may be achieved without access to any original source signal. In some embodiments, the estimated waveforms are generated based on information specifying the further modulation method for combining the source signals into an overlapping bandwidth.

Embodiments of the present disclosure are advantageous at least because they allow two or more source signals to be combined into an overlapping frequency spectrum without foregoing the capability and signal quality needed to ultimately separate and demodulate the signals. For example, in some embodiments, the signals are further modulated or manipulated, before they are combined, to minimize interference and allow the signals to be subsequently separated without foregoing signal quality. In some embodiments, the signals are subjected to different modulations or the same modulation method with different parameters. As non-limiting examples, the signal may be further modulated with different amplitude, phase, delay, or coding before they are combined for transmission. Additionally, as a further example, one or more signal(s) may undergo one or more spectral inversions prior to combining the signals into an overlapping frequency spectrum. As will be appreciated from the present disclosure, embodiments of the invention provide spectral efficiencies (i.e., bps/Hz) that cannot be achieved with traditional satellite communication methods.

The disclosed embodiments are additionally advantageous at least because cancellation of combined source signals may occur without access to the original source signals. Consequently, the disclosed embodiments have a wide scope of application because they do not require access to the original source signals. For example, embodiments of the present disclosure allow different satellite users, who may be in geographically distant locations or beams, to share overlapping frequencies on uplink and/or downlink channels and achieve higher spectral efficiencies.

As further disclosed herein, information signals consistent with the present disclosure may allow the extraction of source signals from combined signals without access to the original source signals. For example, DSPs of the disclosed embodiments may use a predetermined method of combination and subsequent inverse method of demodulation. Alternatively, or additionally, the use of information signals permits flexibility in programming the DSPs to adjust the number of source or user signals that are combined according to the present invention, as well as the employed modulations methods. Such adjustments can be made to meet design or system objectives, both of which can change over time.

In some embodiments, the combined information signal may be sent along with the combined source signal. The combined information signal can be transmitted at a frequency immediately adjacent to the frequency used to transmit the combined source signal or in a separately allocated sub-channel or frequency. Upon receipt, cancellation components in the DSPs may make use of information in the combined information signal to extract and demodulate source signals from the combined signals. The individual information signals and underlying information related to each source signals may also be extracted and utilized for subsequent processing and routing of the signals.

The disclosed embodiments are distinct from traditional satellite communication systems and methods at least because the uplink and/or downlink channels to a satellite in such systems and methods are not shared or overlapping (either in frequency, beam, or polarization) and at least because signals may be combined either on the ground or on-board a satellite. Many traditional satellite communication systems and methods transmit over adjacent but non-overlapping frequencies like, for example, FDMA-based methods. The embodiments disclosed herein are also distinct from two-carrier channel sharing or carrier-in-carrier channel sharing methods at least because access to the original source signals are not required to cancel and extract the desired source signals from a combined signal.

In some aspects, two or more source signals may originate terrestrially. The source signals may be routed to distinct, remote ground terminals or gateway stations then uplinked to a satellite. In such embodiments, a plurality of received signals at the satellite may be combined by a set of digital signal processors (DSPs) into overlapping channels to increase bandwidth efficiency for downlink to gateway ground stations. Then, using a set of DSPs on the ground (e.g., at a gateway ground station), combined signals may be separated into component source signals that are routed terrestrially to the users.

Alternatively, two or more source signals may be routed to a gateway ground station and combined into overlapping frequencies to increase bandwidth efficiency during uplink to the satellite. At the satellite, the combined signal may be cancelled and component signals separated for downlink to respective user ground terminals and/or gateway stations, as needed.

FIG. 1 illustrates an example satellite communications system 150 wherein source signals are separately transmitted on uplink, but combined on downlink. For purposes of illustration, example system 150 of FIG. 1 is shown with a satellite 107 and two remote user terminals A and B (101a, 101b). It will be appreciated that more than two user terminals could be provided in example satellite system 150. Also, for purposes of illustration in FIG. 1, there are separate uplink transmissions of a first source signal (signal A) and a second source signal (signal B) to satellite 107, and a downlink transmission of combined source signals (signal (A+B)) to the gateway ground station. It will also be appreciated that more than one satellite may be involved in the transmission of the signals. For example, each source signal and information signal may be uplinked from ground terminals to distinct satellites, then crosslinked to other satellites until ultimately arriving at satellite 207, where the signals are combined. As a further example, the combined source signal and corresponding information signal(s) may be crosslinked to other satellites prior to downlink to the ground.

Referring in greater detail to FIG. 1, satellite communication system 150 comprises user ground terminal 101a (User Terminal A) and user ground terminal 101b (User terminal B). Each user ground terminal 101a, 101b may comprise one or more processors (e.g., DSPs) capable of generating or otherwise providing a source signal and a corresponding information signal. Ground terminals 101a, 101b may also comprise a modulator for implementing signal modulation and coding schemes. As further shown of FIG. 1, transmitting antennas 100a, 100b are also provided at user ground terminals 101a, 101b to support and provide uplink transmissions (including source signals 105a, 105b and information signals 106a, 106b) to satellite 107 via uplink spot beams 151a, 151b or other beams. Transmitting antennas 100a, 100b may be co-located with their respective user ground terminals or may be distributed or remotely located. Also, spot beams 151a, 151b may vary in size or shape, or may be implemented as other forms of beams.

In some embodiments, source signals 105a, 105b and their respective information signals 106a, 106b may be modulated and exit their respective modems or similar communication equipment at ground terminals 101a and 101b and traverse an uplink transmission path typically consisting of coaxial cables, waveguides, filters, and amplifiers leading to their respective transmitting antennas 100a, 100b for uplink transmission. In the example of FIG. 1, a first source signal 105a is uplinked to satellite 107 by antenna 100a over a first channel and a second source signal 105b is uplinked to satellite 107 by antenna 100b over a second channel. Information signals 106a, 106b to satellite 107 are uplinked over distinct channels or sub-channels adjacent to the channels used by their corresponding source signals 105a, 105b. In some embodiments, the information signals are transmitted on channels remote from the channels used by their corresponding source signals.

In some embodiments, satellite 107 comprises one or more receive (Rx) antennas and digital pathways to route the source signals and their respective information signals to their respective input digital signal processor (DSP) ports. Satellite 107 may further comprise one or more transmit (Tx) antennas for downlink to the ground. Each satellite uplink path is not limited to, but may be comprised of, a receive antenna, a low-noise amplifier, a filter, a digital down converter, and miscellaneous switches, cables, and waveguides. Source signals may or may not share some common satellite components as they are routed from their respective Rx antennas to their respective DSP ports onboard the satellite. In some aspects, the DSP(s) will combine source signals, as further addressed below. Further, consistent with the present disclosure, a combined source signal 111 (A+B) is generated by combining the source signals and transmitted out of one of the DSP ports to the satellite Transmission (Tx) path for transmission to a gateway ground station 112 via a downlink spot beam 152 or other beam.

Information signals may traverse through some or all of the same components on-board satellite 107 as their corresponding source signal. Further, in some aspects, the corresponding source signal information in each information signal may be used by DSP(s) at satellite 107 to generate a combined information signal 110 (Info A+Info B). The combined information signal 110 may follow the downlink Tx path to arrive at gateway ground station 112 via a downlink spot beam 152 or other beam.

Gateway ground station 112 may include a set of DSPs for processing the combined source signal and combined information signal. By using the information in the combined information signal, waveform estimation and source signal extraction from the combined source signal may be achieved by the DSPs without access to any original source signal. In some embodiments, the estimated waveforms of the source signals are generated by the DSPs based on information specifying the further modulation method(s) (e.g., amplitude shift, phase shift, group delay, spectral inversion, and/or pseudo-noise coding) applied to the source signals that have been combined into an overlapping bandwidth. By using the estimated waveforms and signal cancellation (e.g., complex number cancellation computation) each of the source signals made be extracted by the DSPs from the combined source signal. The extracted source signals can then be routed, with a terrestrial network, to one or more user ground terminals.

In some embodiments, the source signals are user signals that comprise communication data that gateway ground station 112 ultimately transfers to one or more user terminal(s).

In some embodiments, each signal source is a representation of any arbitrary source of electronically-transmitted information via a communication medium. The source signals (A, B) may arrive or originate at user ground terminal 101a (User terminal A) and user ground terminal 101b (User terminal B). The sources for the signals in the example of FIG. 1 may be located at the user ground terminal, but it will be appreciated that the signal sources may originate and be modulated anywhere outside of the user ground terminals 101a, 101b and then transmitted to user ground terminals.

Figure 2:
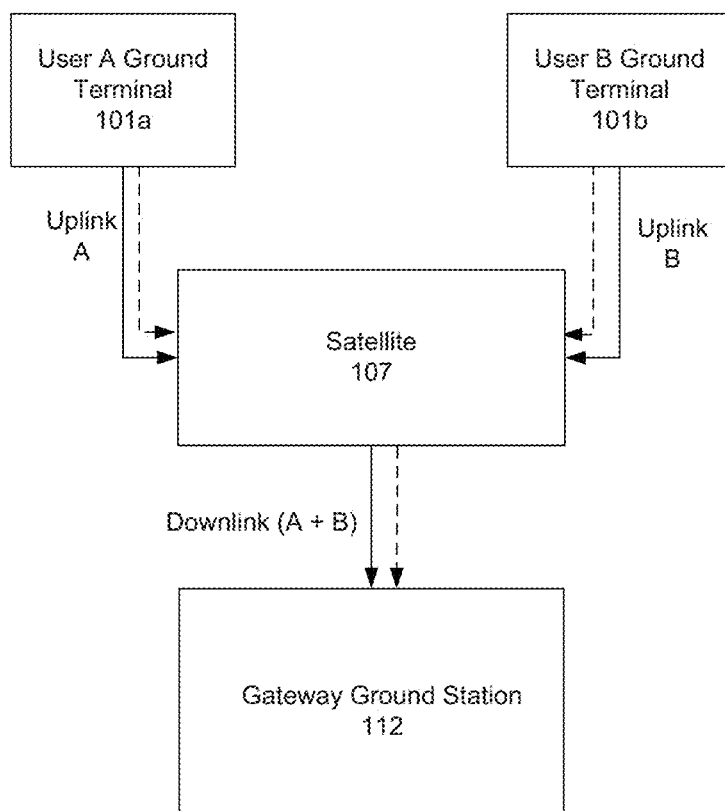
FIG. 2 illustrates an example method for satellite communications, consistent with embodiments of the present disclosure.

FIG. 2 illustrates an example method for satellite communications, consistent with embodiments of the present disclosure. The example method of FIG. 2 provides a process for combining source signals for a downlink transmission from a satellite to a ground site, such as a gateway ground station. At the gateway ground station, estimated waveforms are generated and used to extract the individual source signals from the combined source signal. The extracted source signals can then be routed to one or more user ground terminals.

As shown in FIG. 2, a first source signal (signal A) is uplinked to satellite 107 from a first user ground terminal 101a, and a second source signal (signal B) is uplinked to satellite 107 from a second user ground terminal 101b. Information signals corresponding to each source signal (dashed lines in FIG. 2) may also be uplinked to the satellite 107.

In some embodiments, the source signals and their corresponding information signals are modulated at user ground terminals 101a, 101b before they are uplinked to satellite 107. Alternatively, the source signals and information signals may originate and be modulated anywhere outside of user ground terminals 101a, 101b and then transmitted to the user ground terminals and subsequently uplinked to satellite 107. Information specifying the original source modulation applied to the source signal may be provided in the corresponding information signal, along with error correction information and other signal details.

In some embodiments, the source signals (signals A and B) are transmitted to satellite 107 via orthogonal pathways (e.g., separate frequencies, beams, or polarizations). The corresponding information signals can either be transmitted uplink to satellite 107 at a frequency immediately adjacent to the spectrum used to transmit the source signals or in a separate uplink spectrum distant from the signal source (both forms of transmission being represented by the dashed line in FIG. 2). In some embodiments, the information signals may be immediately adjacent to the source signals and traverse the same uplink pathways as the source signals.

At satellite 107, the source signals (signals A and B) are combined on an overlapping bandwidth over a first channel. Information signal A and information signal B may also be combined into overlapping frequencies over a second channel. The combined source signal (source signals A+B) is downlinked by satellite 107 to gateway ground station 112. In addition, as part of the downlink, the combined information signal may be transmitted (represented by the dashed line in FIG. 2). Alternatively, the information signals may be downlinked over separate frequencies.

In some embodiments, satellite 107 includes a set of DSPs for combining the source signals (signals A and B) into a combined source signal with an overlapping bandwidth. In such embodiments, each of the source signals is further modulated according to at least one predetermined modulation method (e.g., amplitude shift, phase shift, group delay, spectral inversion, pseudo-noise coding, etc.) before they are combined. The further modulation may be applied to the source signals at the user ground terminals or after uplink and on-board the satellite before the signals are combined to generate the combined source signal. In the downlink transmission from satellite 107 to gateway ground station 112, the combined source signal is transmitted along with information specifying the at least one predetermined modulation method applied as part of the secondary or further modulation on the source signals.

In some embodiments, a combined information signal is included in the downlink transmission to gateway ground station 112. The combined information signal may be generated by the DSP(s) on-board satellite 107 based on the received information signals and include information specifying the at least one predetermined modulation method and further information related to each of the plurality of source signals that have been combined into the combined source signal. In some embodiments, the combined information signal comprises a modulated parameter specifying the at least one predetermined modulation method, and further comprises, for each of the plurality of source signals, one or more of a user ID, a source modulation type, an error correction code type, and a code rate. In some embodiments, for each modulated parameter, a parameter value may also be provided in the combined information signal to indicate a parameter value associated with the modulation method.

Referring again to FIG. 2, the combined source signal (A+B) and combined information signal may be processed by gateway ground station 112. For example, one or more DSPs at gateway ground station 112 may extract, from the combined information signal, the information specifying the at least one predetermined modulation method. From the at least one predetermined modulation method, the DSPs may generate a plurality of estimated waveforms corresponding to the plurality of source signals. Then, by using signal cancellation (e.g., complex number cancellation computation) and the plurality of estimated waveforms, the plurality of source signals may be separated from the combined source signal. In addition, filtering and demodulation (i.e., the reverse of the further modulation method applied to the source signals) may be applied to the signals. Thereafter, gateway ground station 212 may route, with a terrestrial network or similar communication equipment, the plurality of source signals to one or more user ground terminals or other ground sites (i.e., the intended recipients of the source signals).

Figure 3:
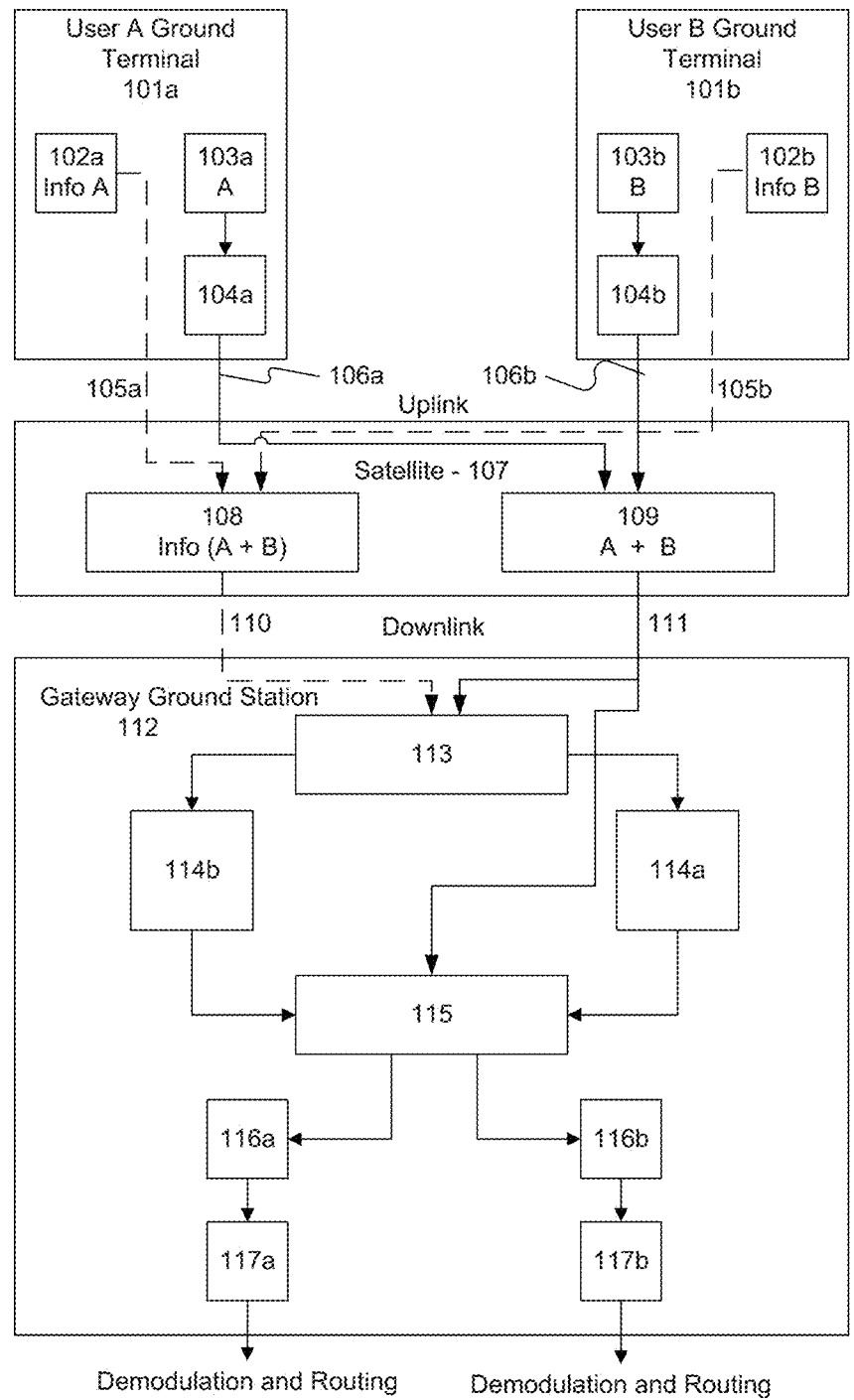
FIG. 3 illustrates a more detailed example satellite communications system that can be used to implement the method of FIG. 2.

FIG. 3 illustrates a more detailed example satellite communications system that can be used to implement the method of FIG. 2 and other embodiments of the present disclosure. The arrangement of components and steps in FIG. 3 is provided for illustration and is not intended to limit the invention or the scope of the claims. As will be appreciated from this disclosure, the components and steps of FIG. 3 may be changed, modified, substituted, or rearranged, consistent with the present disclosure. For example, while only two source signals and user ground terminals are shown in FIG. 3, it will be appreciated that more than two source signals and user ground terminals may be included.

In the example embodiment of FIG. 3, each user ground terminal 101a, 101b includes a set of DSPs (i.e., one or more DSPs) capable of routing a source signal to a set of transmission antennas for uplink 106a, 106b to satellite 107. Each source signal 103a, 103b may include or represent electronically-transmitted information via a communication medium. The source signals in this example may originate at user ground terminals 101a, 101b and be applied with source modulation, or may originate and be modulated outside of the user ground terminals and then transmitted to the user ground terminals. The DSPs at the user ground terminals 101a, 101b may further modulate the source signals 103a, 103b to provide modulated source signals 104a, 104b prior to uplink 106a, 106b. In this regard, one or more further modulation methods may be utilized (e.g., amplitude shift, phase shift, group delay, spectral inversion, and/or pseudo-noise coding). Alternatively, source signals 103a, 103b may be directly uplinked to satellite 107, where the further modulation is applied to each source signal before the modulated source signals 104a, 104b are combined into a combined source signal 109.

As further shown in FIG. 3, a first information signal 102a and a second information signal 102b are also provided that correspond to each source signal 103a, 103b. The first and second information signals may also be uplinked 105a, 105b to satellite 107. In some respects, the information in the information signals at least allows DSP(s) on-board satellite 107 to combine the first and second source signals to provide a combined information signal 109. The information in the information signals may also allow the set of DSP(s) at gateway ground station 112 to apply inverse transforms, signal cancellation, and/or a signal identification method(s) to the received combined source signal to extract the individual source signals 116a, 116b, then optionally filter 117a, 117b those source signals. Although not shown in FIG. 3, gateway ground station 112 may further comprise communication equipment for routing the source signals to each intended recipient (e.g., via a terrestrial network to one or more user ground terminals). Upon receipt of the routed signals at the user ground terminals or other ground site, demodulation of the source modulation, error correction, and/or other processing steps may be taken, for example.

Referring again to FIG. 3, each information signal 102a, 102b may be uplinked 105a, 105b to satellite 107, with the uplink beam being determined by user ground terminal 101a, 101b based on the position of satellite 107 and frequencies assigned to the uplink channel for the information signal. Further, each modulated source signal 104a, 104b may be uplinked 106a, 106b using, for example, a satellite uplink spot beam from user ground terminal 101a, with the uplink beam being determined by user ground terminal 101a, 101b based on the position of satellite 107 and frequencies assigned to the uplink channel for the source signal.

In some embodiments, source signals 103*a*, 103*b* may be routed through a terrestrial network to user ground terminals 101*a*, 101*b* prior to uplink 106*a*, 106*b* to satellite 107. The terrestrial network (not shown in FIG. 3) may comprise cellular and/or wired communication networks, for example.

In some embodiments, the source modulation method applied to source signals 103*a*, 103*b* comprises a Digital Video Broadcasting (DVB) standard. For example, the method of source modulation may be DVB-S2 or DVB-S2X.

In some embodiments, the method of modulation for the source signals comprises at least one Amplitude Phase Shift Key (APSK), Frequency Division Multiple Access (FDMA), Time Division Multiple Access (TDMA), Code Division Multiple Access (CDMA), and/or a multiplexing method. In some embodiments, one or more similar modulation methods may be used for purposes of applying the further modulation to the source signals.

At satellite 107, the source signals 104*a*, 104*b* received via uplink 106*a*, 106*b* are combined to generate a combined source signal 109. Combined source signal 109 may comprise first modulated source signal 104*a* and second modulated source signal 104*b* in an overlapping bandwidth. In some embodiments, satellite 107 includes a set of DSPs for combining source signals 104*a*, 104*b* into combined source signal 109 with an overlapping bandwidth. As previously discussed, each of the source signals are further modulated according to at least one predetermined modulation method (e.g., amplitude shift, phase shift, group delay, spectral inversion, pseudo-noise coding, etc.) before they are combined. The further modulation may be applied to the source signals at user ground terminals 101*a*, 101*b* (as shown in FIG. 3) or the further modulation may be applied after uplink and on-board satellite 107 before the signals are combined to generate the combined source signal 109.

In addition, at satellite 107, a combined information signal 108 may be generated based on information in the first and second information signals 102*a*, 102*b* received via uplink 105*a*, 105*b*. In some embodiments, the combined information signal 110 may be generated by the set of DSP(s) on-board satellite 107 based on the received information signals 102*a*, 102*b* and include information specifying the source modulation method as well as the secondary or further modulation method applied to the source signals. Combined information signal 111 may also include other information related to each of the source signals that have been combined into the combined source signal. An example embodiment of a combined information signal is described below with reference to FIG. 8.

In the embodiment of FIG. 3, the satellite uplink path is not limited to, but typically composed of, one or more receive (Rx) antennas, a low-noise amplifier, a filter, a digital down converter, and miscellaneous switches, cables, and waveguides. Received source signals may or may not share some common satellite components as they are routed from their respective Rx antennas to their respective DSP ports on-board satellite 107. DSPs may alter and combine the signals to enable greater bandwidth efficiency on downlinks 110, 111. The DSP may digitize analog signals using an Analog-to-Digital Converter (ADC). These digitalized signals may be filtered and may be routed to either an application specific integrated circuit (ASIC) or field programmable gate array (FPGA) in which the DSP may apply transforms and manipulations to further modulate the signals (e.g., by amplitude shift, phase shift, group delay, and/or spectral inversion). Additionally or alternately, the DSP may apply Pseudorandom Noise (PN) coding. As previously discussed, the DSPs of satellite 107 combine the signals such that they overlap in frequency. Embodiments may comprise either or both regenerative and non-regenerative digital signal processor implementations.

In some embodiments, the combined source signal 109 is generated by overlapping modulated source signals 104*a*, 104*b* into overlapping frequencies to increase bandwidth use. In some embodiments, information signals 102*a*, 102*b* are combined to provide a combined information signal 108, wherein the information signals overlap in the same set of frequencies to increase bandwidth use. In some embodiments, information signals 102*a*, 102*b* are not combined into overlapping frequencies but instead combined information signal 108 is generated at satellite 107 as a new frame or signal including information from signals 102*a*, 102*b* as well as other information, such as at least one further modulation method. An example embodiment of the frame content and structure of a combined information signal is described below with reference to FIG. 8.

In some embodiments, satellite 107 is implemented as a high throughput satellite (HTS) and includes one or more digital switch units that are programmable and can be used to flexibly assign frequencies and manage satellite communication channels. Each digital switch unit, such as those commercially available, may enable the provisioning of information signals to send parameters to and between satellite 107 and ground sites (including user terminals and gateways). Each digital switch unit may also include a set of DSPs (including hardware and functions) for implementing aspects of the present disclosure, including the combining and extracting of signals. In some embodiments, the digital switch units have built-in algorithms or functions, such as gain, phase, spectral inversion, and/or group delay adjustment capabilities, that are default transform functions. The digital switch units may further comprise one or more application specific integrated circuits (ASIC) or field programmable gate arrays (FPGA) that permit signal processing algorithms or functions to be programmed or otherwise provisioned. In some embodiments, a set of DSPs or equivalent processing components are provided that are configured to, for example, further modulate the individual source signals (e.g., by amplitude shift, phase shift, group delay, spectral inversion, and/or pseudo-noise coding) and then combine the source signals such that they overlap in frequency. That is, the programmable digital switch units allow the signals to be combined such that they are summed together into one overlapping bandwidth, without foregoing the capability and signal quality needed to ultimately separate and demodulate the signals. It will be appreciated that the embodiments are not limited to the foregoing examples.

In some embodiments, the DSPs at user ground terminals 101*a*, 101*b* and/or satellite 107 may dynamically change one or more parameters and methods related to the disclosed embodiments, including the number of users/source signals that are combined, the source modulation method, the secondary or further modulation method, and channel-frequency allocation, for example. The ability to change or dynamically adjust such parameters allows an operator to optimize the system utilization and bandwidth efficiency according to existing needs and the particulars of each coverage area.

Referring again to FIG. 3, combined signals 108, 109 are received via downlinks 110, 111 by gateway ground station 112. In some embodiments, a signal extraction module 113 of gateway ground station 112 extracts component information signals 102*a*, 102*b* from combined information signal 108 using, for example, predetermined demodulation techniques. In other embodiments, first and second information signals 102a, 102b may be generated at gateway ground station 112 by extracting the corresponding signal information from combined information signal 108 and reconstituting each information signal from that information. In such embodiments, a user or channel ID may be provided in combined information signal 108 to designate or mark the corresponding information for each information signal/source signal (see FIG. 8 below). In cases where signals 102a, 102b are combined and subsequently extracted from combined information signal 108, additional demodulation steps on the individual information signals 102a, 102b may be taken by signal extraction module 113.

As further shown in FIG. 3, signal extraction module 113 may use information in the information signals 102a, 102b to generate estimated waveforms 114a, 114b corresponding to the modulated first and second source signals 104a, 104b, respectively, that are included in combined source signal 109. In some embodiments, signal extraction module 113 extracts, from the combined information signal 108, the information specifying the secondary or further modulation method, and generates, based on the further modulation method, the estimated waveforms corresponding to the source signals.

In some embodiments, generating estimated waveforms comprises resampling the signal based on the data rate and modulation type specified by the information signal. Alternatively, or additionally, in some embodiments, resampling the signal based on the data rate and modulation type specified by the information signal may allow for the interfering or overlapping source signal to be estimated, inverted, and reapplied to the combined waveform for cancellation, yielding the desired waveform. These examples are not limiting, and it will be appreciated that other embodiments may be utilized for generating estimated waveforms.

With the estimated waveforms 114a, 114b, gateway ground station 112 can extract the source signals from the combined source signal 109. As shown in FIG. 3, a signal cancellation module 115 may be provided that applies signal cancellation methods to the received combined source signal 109, using the estimated waveforms 114a, 114b, to extract and isolate modulated source signals 116a, 116b (corresponding to signals 104a, 104b). For example, signal cancellation module 115 may apply complex cancellation methods. In the embodiment of FIG. 3, modulated source signal 104a may be isolated 116a using estimated waveform 114b, and modulated source signal 104b may be isolated 116b using estimated waveform 114a.

In some embodiments, isolated source signals 116a, 116b (corresponding to modulated source signals 104a, 104b) may be filtered 117a, 117b at gateway ground station 112. Further, as part of the filtering stage or as a subsequent step, demodulation may be performed on the signals (e.g., the reverse of the further modulation method applied to the signals). In some aspects, the filtering and demodulation may be performed by the set of DSPs at gateway ground station 112. Thereafter, gateway ground station 112 may route, with a terrestrial network or similar communication equipment, the plurality of source signals to one or more user ground terminals or other ground sites (i.e., the intended recipients of the source signals).

Figure 4:
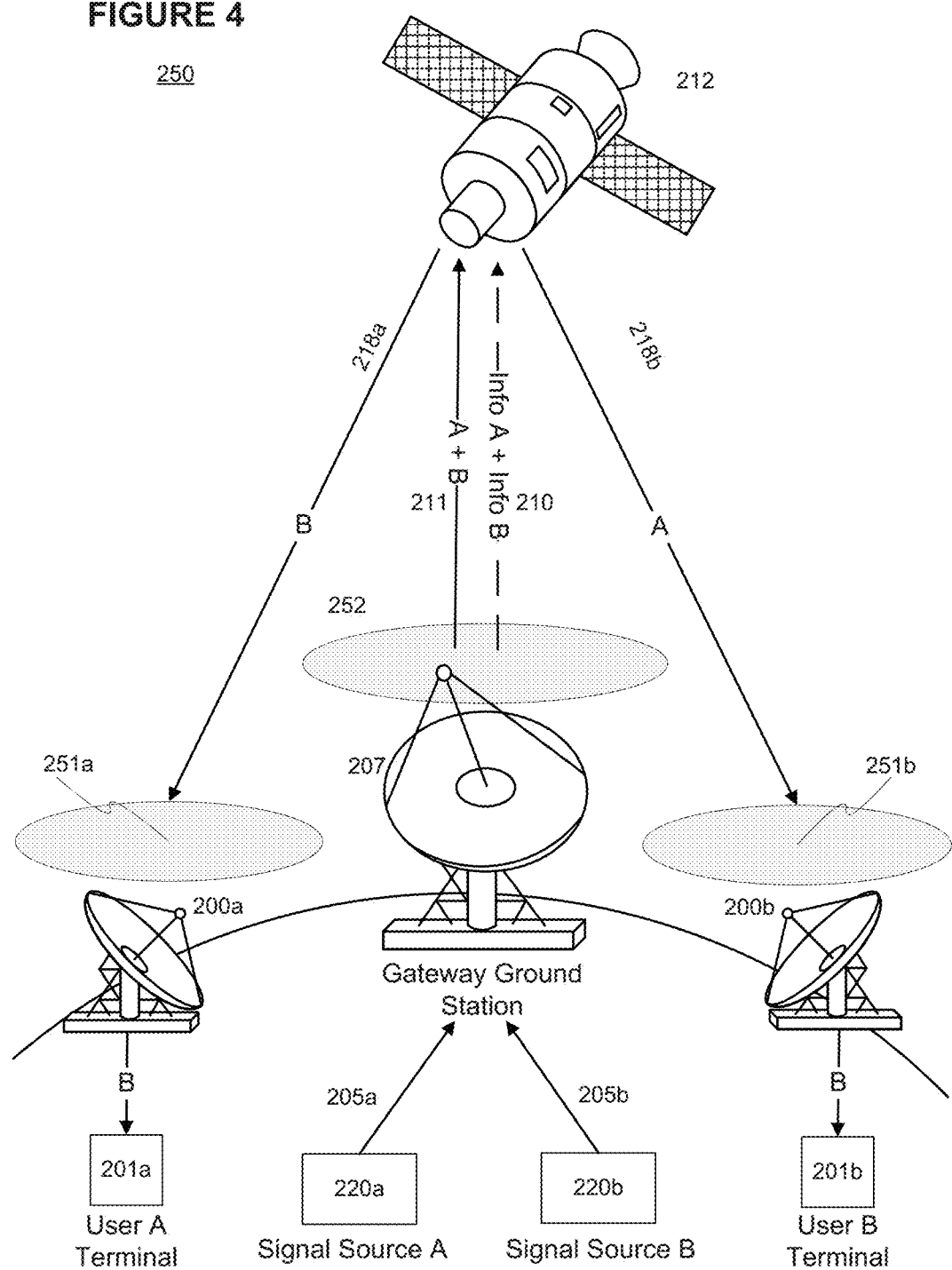
FIG. 4 illustrates an example satellite communications system wherein signals are combined on uplink but separately transmitted on downlink.

FIG. 4 illustrates an example satellite communications system 250 wherein source signals are combined and transmitted as a combined source signal on uplink, but separated on downlink. For purposes of illustration, the example system 250 of FIG. 4 is shown with a satellite 212 and two signal sources, Source A (220a) and Source B (220b). Signal sources 220a, 220b, may be any source for providing a source signal. By way of non-limiting examples, sources 220a, 220b may comprise one or more of a server, a network, a database, a user terminal, a ground site, etc. It will be appreciated that more than two signal sources 220a, 220b could be provided in example satellite system 250. Also, for purposes of illustration, in FIG. 4 there is separate routing of a first source signal 205a (signal A) and a second source signal 205b (signal B) from signal sources 220a, 220b to gateway ground station 207; an uplink transmission from gateway ground station 207 to a satellite 212 of a combined first source signal and second source signal (signal (A+B)); and a downlink transmission of separated signals source signal A and source signal B to remote user ground terminals 201, 201b. It will also be appreciated that more than one satellite may be involved in the transmission of signals. For example, the combined source signal and corresponding information signal(s) may be uplinked from ground gateway station 207 to one satellite, then crosslinked to other satellites until ultimately arriving at satellite 212, where the source signals are separated. As a further example, the separated source signals may be crosslinked to other satellites prior to downlink to the ground.

Referring in greater detail to FIG. 4, satellite communication system 250 comprises two signal sources 220a, 220b. Each signal source 220a, 220b may comprise one or more processors (e.g., DSPs) and/or other hardware for generating or otherwise providing a source signal and a corresponding information signal. In some embodiments, signal sources 220a, 220b may comprise a modulator for implementing signal modulation and coding schemes.

In some embodiments, source signals 205a, 205b and their respective information signals may be modulated and exit their respective modems or similar communication equipment at signal sources 220a, 220b and traverse a transmission path typically consisting of coaxial cables, waveguides, filters, and amplifiers leading to gateway ground station 207. In the example of FIG. 4, first source signal 205a is terrestrially routed to gateway ground station 207 over a first pathway and second source signal 205b is terrestrially routed to gateway ground station 207 over a second pathway. In addition, a first information signal corresponding to the first source signal 205a is also routed to gateway ground station 207 over the same or a different pathway taken by first source signal 205a, and a second information signal corresponding to the second source signal 205b is also routed to gateway ground station 207 over the same or a different pathway taken by second source signal 205b. The information signals may include information regarding the source modulation method for the corresponding source signals, as well as error correction information and other details related to the signal.

In some embodiments, the source signals are user signals that comprise communication data that satellite 212 ultimately downlinks via spot beam(s) 251a, 251b or other beam(s) to one or more user terminal(s) 201a, 201b. As will be appreciated, spot beams 251a, 251b may vary in size or shape, or may be implemented as other form of beams.

In some embodiments, each signal source is a representation of any arbitrary source of electronically-transmitted information via a communication medium. The source signals 205a, 205b may arrive or originate at signal source 220a and signal source 220b, as shown in FIG. 4.

Gateway ground station 207 includes one or more DSPs and one more receiving modems or similar equipment that routes received source signals and received information signals for processing. In some aspects, the DSP(s) will combine the received source signals into a combined source signal. For example, consistent with the present disclosure, a combined source signal 211 (A+B) is generated by combining the source signals into overlapping frequencies at gateway ground station 207 and may be transmitted out of one of the DSP ports to a gateway ground Transmission (Tx) path for uplink transmission to satellite 212. The uplink may occur over a spot beam 252 or other beams.

In some embodiments, gateway ground station 207 includes one or more programmable digital switch units that can flexibly assign frequencies and manage satellite communication channels. Each digital switch unit may enable the provisioning of information signals to send parameters to and between satellite 207 and ground sites (including user terminals and gateways). DSPs at the gateway ground station 207 may be capable of implementing aspects of the present disclosure, including the combining and extracting of signals. Each digital switch unit may have built-in algorithms, such as gain, phase, spectral inversion, and/or group delay adjustment capabilities, that are default transform functions. The digital switch units may further comprise one or more application specific integrated circuits (ASIC) or field programmable gate arrays (FPGA) that permit signal processing algorithms or functions to be programmed or otherwise provisioned. In some embodiments, a set of DSPs or equivalent processing components are provided that are configured to, for example, further modulate the individual source signals (e.g., by amplitude shift, phase shift, group delay, spectral inversion, and/or pseudo-noise coding) and then combine the source signals such that they overlap in frequency. That is, the programmable digital switch units allow the signals to be combined such that they are summed together into an overlapping bandwidth, without foregoing the capability and signal quality needed to ultimately separate and demodulate the signals. It will be appreciated that the embodiments are not limited to the foregoing examples.

Further, the set of DSPs in gateway ground station 207 may generate a combined information signal from the received information signals. In some embodiments, the information in each information signal is used by DSP(s) at gateway ground station 207 to generate a combined information signal (Info A+Info B). An example of a combined information signal is provided in FIG. 8. The combined information signal may follow the gateway ground Transmission (Tx) path for uplink transmission to satellite 212.

In some embodiments, satellite 212 comprises one or more receive (Rx) antennas and digital pathways to route the combined source signal (A+B) and combined information signal to input digital signal processor (DSP) ports. Each satellite uplink path is not limited to, but may be comprised of, one or more receive antennas, a low-noise amplifier, a filter, a digital down converter, and miscellaneous switches, cables, and waveguides. Satellite 212 further comprises one or more Tx antennas for downlink to the ground.

In the embodiment of FIG. 4, signal cancellation module(s) in DSPs on satellite 212 may separate the combined source signal into component source signal A and source signal B. Also, signal extraction module(s) in DSPs on satellite 212 may separate combined information signals into component information signal A and information signal B.

Satellite 212 may include a set of DSPs for processing the combined source signal and combined information signal. By using the information in the combined information signal, waveform estimation and source signal extraction from the combined source signal may be achieved by the DSPs without access to any original source signal. In some embodiments, the estimated waveforms of the source signals are generated by the DSPs based on information specifying the further modulation method(s) (e.g., amplitude shift, phase shift, group delay, spectral inversion, and/or pseudo-noise coding) applied to the source signals that have been combined into an overlapping bandwidth. By using the estimated waveforms and signal cancellation (e.g., complex number cancellation computation) each of the source signals made be extracted by the DSPs from the combined source signal. The extracted source signals can then be routed, with a terrestrial network, to one or more user ground terminals.

Figure 5:
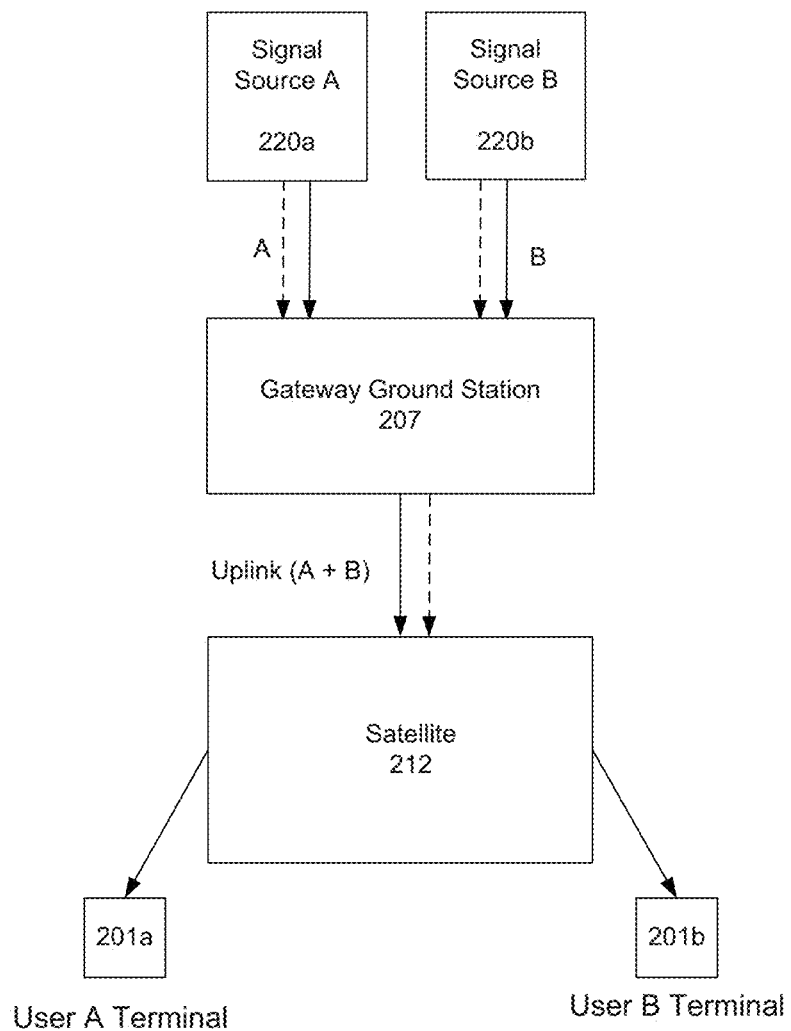
FIG. 5 illustrates an example method for satellite communications, consistent with embodiments of the present disclosure.

FIG. 5 illustrates an example method for satellite communications consistent with the present disclosure. The example method of FIG. 5 provides a process for combining source signals for an uplink, and subsequently extracting the individual source signals at the received end of the transmission on-board a satellite. At the satellite, estimated waveforms are generated and used to extract the individual source signals from the combined source signal. The extracted source signals can then be downlinked via spot beams or other beams to one or more user ground terminals or other ground sites.

As shown in FIG. 5, a first source signal (signal A) is routed from a first signal source 220a to a gateway ground station 207, and a second source signal (signal B) is routed to gateway ground station 207 from a second signal source 220b. Information signals corresponding to each source signal (dashed lines in FIG. 5) may also be routed to gateway ground station 207.

In some embodiments, the source signals and their corresponding information signals are modulated at signal sources 220a, 200b before they are routed to gateway ground station 207. Information specifying the original source modulation applied to the source signal may be provided in the corresponding information signal, along with error correction information and other signal details.

At gateway ground station 207, the source signals (signals A and B) are combined on an overlapping bandwidth over a first channel. Information signal A and information signal B may also be combined into overlapping frequencies over a second channel. Alternatively, a combined information signal (see, e.g., FIG. 8) may be generated from the received information signals. The combined source signal (A+B) is then uplinked to satellite 212. In some embodiments, as part of the same channel or a related sub-channel for the uplink of the combined source signal, the combined information signal is transmitted (represented by the dashed line in FIG. 5) to satellite 212. Alternatively, the combined information signal may be uplinked over separate frequencies.

In some embodiments, gateway ground station 207 includes a set of DSPs for combining the source signals (signals A and B) into a combined source signal with an overlapping bandwidth. In such embodiments, each of the source signals is further modulated according to at least one predetermined modulation method (e.g., amplitude shift, phase shift, group delay, spectral inversion, pseudo-noise coding, etc.) before they are combined. The further modulation may be applied to the source signals at signal sources 220a, 220b or gateway ground station 207 before the signals are combined to generate the combined source signal. In the uplink transmission from gateway ground station 207 to satellite 212, the combined source signal is transmitted along with information specifying the at least one predetermined modulation method applied as part of the secondary or further modulation on the source signals.

In some embodiments, a combined information signal is included in the uplink transmission to satellite 212. The combined information signal may be generated by the DSP(s) of the gateway ground station 207 based on the received information signals and include information specifying the at least one predetermined modulation method and further information related to each of the plurality of source signals that have been combined into the combined source signal. In some embodiments, the combined information signal comprises a modulated parameter specifying the at least one predetermined modulation method, and further comprises, for each of the plurality of source signals, one or more of a user ID, a source modulation type, an error correction code type, and a code rate. In some embodiments, for each modulated parameter, a parameter value may also be provided in the combined information signal to indicate a parameter value associated with the modulation method.

Referring again to FIG. 5, the combined source signal (A+B) and combined information signal may be processed by satellite 212. For example, one or more DSPs at the satellite 212 may extract, from the combined information signal, the information specifying the at least one predetermined modulation method. From the at least one predetermined modulation method, the DSPs may generate a plurality of estimated waveforms corresponding to the plurality of source signals. Then, by using signal cancellation (e.g., complex number cancellation computation) and the plurality of estimated waveforms, the plurality of source signals may be separated from the combined source signal. In addition, filtering and demodulation (e.g., the reverse of the further modulation method applied to the source signals) may be applied to the signals. Thereafter, satellite 212 may downlink the plurality of source signals to one or more user ground terminals or other ground sites (i.e., the intended recipients of the source signals) via spot beams or other beams.

Figure 6:
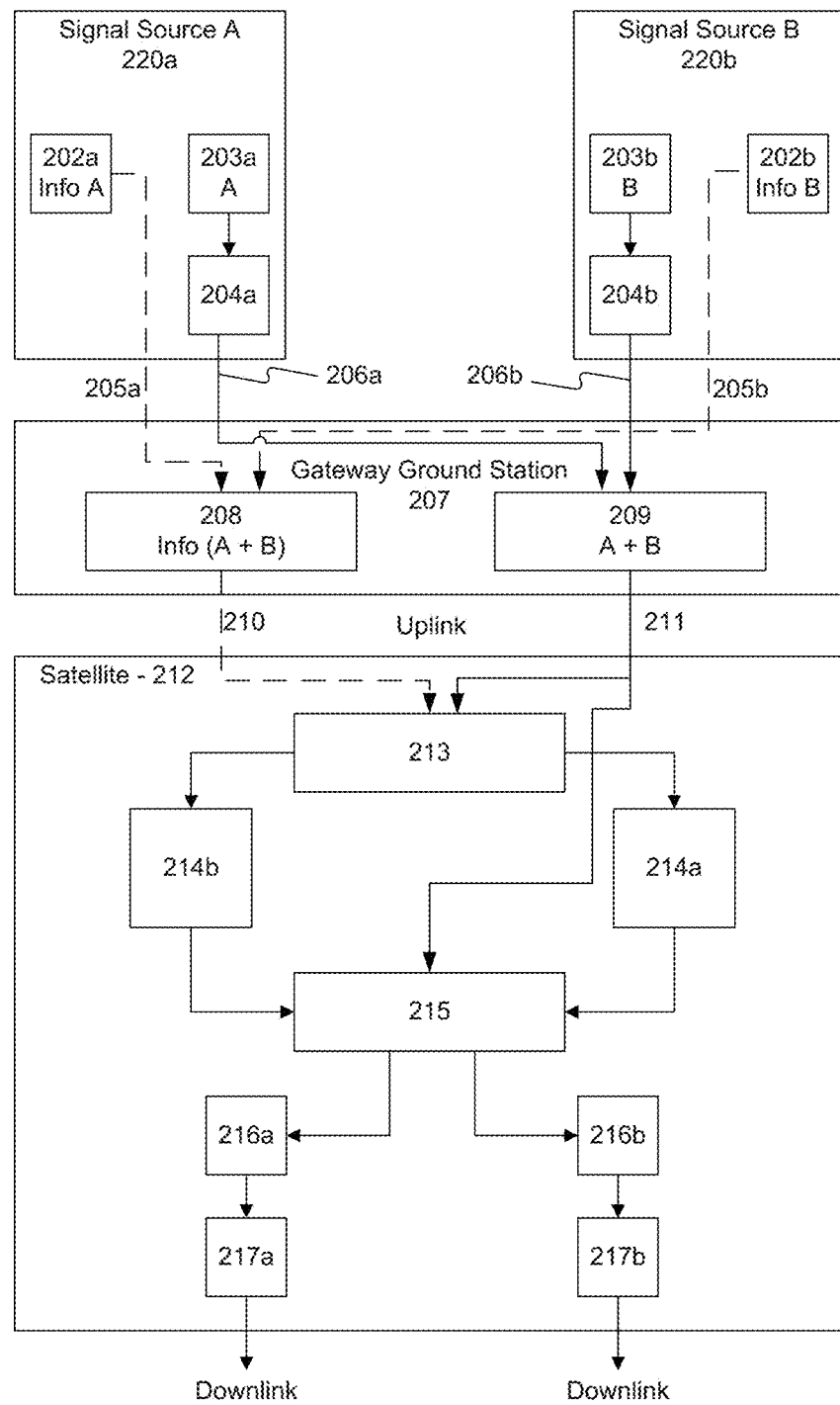
FIG. 6 illustrates a more detailed example satellite communications system that can be used to implement the method of FIG. 5.

FIG. 6 illustrates a more detailed example satellite communications system that can be used to implement the method of FIG. 5 and other embodiments of the present disclosure. The arrangement of components and steps in FIG. 6 is provided for illustration and is not intended to limit the invention or the scope of the claims. As will be appreciated from this disclosure, the components and steps of FIG. 6 may be changed, modified, substituted, or rearranged, consistent with the present disclosure. For example, while only two source signals and user ground signal source stations are shown in FIG. 6, it will be appreciated that more than two source signals and user ground signal source stations may be included In the example embodiment of FIG. 6, each signal source 220a, 220b includes a set of DSPs (i.e., one or more DSPs) and a set of modems and/or similar equipment capable of terrestrially routing source signals to a gateway ground station 207. Each source signal 203a, 203b may represent electronically-transmitted information via a communication medium. The DSPs at the signal sources 220a. 220b may be capable of modulating the source signals 204a, 204b prior to routing 206a, 206b. In this regard, one or more further modulation methods may be utilized (e.g., amplitude shift, phase shift, group delay, spectral inversion, and/or pseudo-noise coding). Alternatively, source signals 203a, 203b may be directly routed to gateway ground station 207, where the further modulation is applied to each source signal before the modulated source signals 204a, 204b are combined into a combined source signal 209.

As further shown in FIG. 6, a first information signal 202a and a second information signal 202b are also provided that correspond to each source signal 203a, 203b. The first and second information signals may also be terrestrially routed 205a, 205b to gateway ground station 207. In some embodiments, the information in the information signals at least allows DSP(s) at gateway ground station 207 to combine the first and second source signals 209. The information in the information signals additionally allows DSP(s) capable of carrier extraction 215 in satellite 212 to apply inverse transforms, signal cancellation, and/or a signal identification method to the received combined source signal to extract the individual source signals 216a, 216b, then optionally filter 217a, 217b the source signals. Although not shown in FIG. 6, satellite 212 further comprises downlink Tx antennas capable of transmitting the source signals to each intended recipient. Upon receipt at the user ground terminals or other ground site, demodulation of the source modulation, error correction, and other processing steps may be performed, for example.

Referring again to FIG. 6, information signals 202a, 202b, and modulated source signal 204a, 204b may be routed over a terrestrial network to gateway ground station 207. The terrestrial network may comprise cellular and/or wired communication networks.

In some embodiments, the source modulation method applied to source signals 203a, 203b comprises a Digital Video Broadcasting (DVB) standard. For example, the method of source modulation may be DVB-S2 or DVB-S2X.

In some embodiments, the method of modulation for the source signals comprises at least one Amplitude Phase Shift Key (APSK), Frequency Division Multiple Access (FDMA), Time Division Multiple Access (TDMA), Code Division Multiple Access (CDMA), and/or a multiplexing method. In some embodiments, one or more similar modulation methods may be used for purposes of applying the further modulation to the source signals.

At gateway ground station, 207, the received source signals 204a, 204b are combined to generate a combined source signal 209. Combined source signal 209 may comprise first modulated source signal 204a and second modulated source signal 204b in an overlapping bandwidth. In some embodiments, gateway ground station 207 includes a set of DSPs for combining source signals 204a, 204b into combined source signal 209 with an overlapping bandwidth. As previously discussed, each of the source signals are further modulated according to at least one predetermined modulation method (e.g., amplitude shift, phase shift, group delay, spectral inversion, pseudo-noise coding, etc.) before they are combined. The further modulation may be applied to the source signals at signal source 220a, 220b (as shown in FIG. 6) or the further modulation may be applied at gateway ground station 207 before the signals are combined to generate the combined source signal 209.

In addition, at gateway ground station 207, a combined information signal 208 may be generated based on information in the first and second information signals 202a, 202b. In some embodiments, combined information signal 208 may be generated by the set of DSP(s) at gateway ground station 207 based on the received information signals 202a, 202b and include information specifying the source modulation method as well as the secondary or further modulation method applied to the source signals. Combined information signal 208 may also include other information related to each of the source signals that have been combined into the combined source signal. An example embodiment of a combined information signal is described below with reference to FIG. 8.

In the embodiment of FIG. 6, the signals are routed to the set of DSPs at gateway ground station 207. The received source signals may or may not share some common components as they are routed from their respective DSP ports at gateway ground station 207. The set of DSPs may alter and combine the source signals to enable greater bandwidth efficiency on the uplink 211 to satellite 212. The DSPs may digitize analog signals using an Analog-to-Digital Converter (ADC). These digitalized signals may be filtered and may be routed to either an application specific integrated circuit (ASIC) or field programmable gate array (FPGA) in which the DSPs may apply transforms and manipulations that may modify the amplitude, phase, group delay, and/or spectral inversion. Additionally or alternately, the DSPs may apply Pseudorandom Noise (PN) coding. As previously discussed, the DSPs of gateway ground station 207 combine the signals such that they overlap in frequency. Embodiments may comprise either or both regenerative and non-regenerative digital signal processor implementations.

In some embodiments of FIG. 6, the combined source signal 209 is generated by overlapping further modulated source signals 204*a*, 204*b* into overlapping frequencies to increase bandwidth use. For example, in some embodiments, the signals are further modulated or manipulated, before they are combined, to minimize interference and allow the signals to be subsequently separated without foregoing signal quality. In some embodiments, the signals are subjected to different modulations or the same modulation method with different parameters. As non-limiting examples, the signal may be further modulated with different amplitude, phase, delay, or coding before they are combined for transmission. Additionally, as a further example, one or more signal(s) may undergo one or more spectral inversions prior to combining the signals into an overlapping frequency spectrum. As will be appreciated from the present disclosure, embodiments of the invention provide spectral efficiencies (i.e., bps/Hz) that cannot be achieved with traditional satellite communication methods.

In some embodiments, information signals 202*a*, 202*b* are combined to provide a combined information signal 208, wherein the information signals overlap in the same set of frequencies to increase bandwidth use. In some embodiments, information signals 202*a*, 202*b* are not combined into overlapping frequencies but instead combined information signal 208 is generated at gateway ground station 207 as a new frame or signal including information from signals 202*a*, 202*b* as well as other information, such as the further modulation method. An example embodiment of the frame content and structure of a combined information signal is described below with reference to FIG. 8.

In some embodiments, digital signal processors at one or more signal sources 220*a*, 220*b*, gateway ground station 207, and/or satellite 212 may dynamically change one or more parameters and methods related to the disclosed embodiments, including the number of users/source signals that are combined, the source modulation method, the secondary or further modulation method, and channel-frequency allocation, for example. The ability to change or dynamically adjust such parameters allows an operator to optimize the system utilization and bandwidth efficiency according to existing needs and the particulars of each coverage area.

Referring again to FIG. 6, combined signals 208, 209 are received via uplinks 210, 211 to satellite 212.

In some embodiments, satellite 212 is implemented as a high throughput satellite (HTS) and includes one or more digital switch units that are programmable and can be used to flexibly assign frequencies and manage satellite communication channels. Each digital switch unit, such as those commercially available, may enable the provisioning of information signals to send parameters to and between satellite 212 and ground sites (including user terminals and gateways). Each digital switching unit may include a set of DSPs (including hardware and functions) for implementing the above aspects of the present invention, including the combining and extracting of signals. In some embodiments, the digital switch units have built-in algorithms or functions, such as gain, phase, spectral inversion, and/or group delay adjustment capabilities, that are default transform functions. The digital switch units may further comprise one or more application specific integrated circuits (ASIC) or field programmable gate arrays (FPGA) that permit signal processing algorithms or functions to be programmed or otherwise provisioned. In some embodiments, a set of DSPs or equivalent processing components are provided that are configured to, for example, further modulate the individual source signals (e.g., by amplitude shift, phase shift, group delay, spectral inversion, and/or pseudo-noise coding) and then combine the source signals such that they overlap in frequency. That is, the programmable digital switch units allow the signals to be combined such that they are summed together into an overlapping bandwidth, without foregoing the capability and signal quality needed to ultimately separate and demodulate the signals. It will be appreciated that the embodiments are not limited to the foregoing examples.

In some embodiments, a signal extraction module 213 of satellite 212 extracts component information signals 202*a*, 202*b* from the combined information signal 208 using, for example, predetermined demodulation techniques. In other embodiments, first and second information signals 202*a*, 202*b* may be generated at satellite 212 by extracting the corresponding signal information from combined information signal 208 and reconstituting each information signal from that information. In such embodiments, a user or channel ID may be provided in combined information signal 208 to designate or mark the corresponding information for each information signal/source signal (see FIG. 8 below). In cases where signals 202*a*, 202*b* are combined and subsequently extracted from combined information signal 208, additional demodulation steps on the individual information signals 202*a*, 202*b* may be taken by signal extraction module 213.

As further shown in FIG. 6, signal extraction module 213 may use information in information signals 202*a*, 202*b* to generate estimated waveforms 214*a*, 214*b* corresponding to the modulated first and second source signals 204*a*, 204*b*, respectively, that are included in combined source signal 209. In some embodiments, signal extraction module 213 extracts, from the combined information signal 208, the information specifying the secondary or further modulation method, and generates, based on the further modulation method, the estimated waveforms corresponding to the source signals.

In some embodiments, generating estimated waveforms comprises resampling the signal based on the data rate and modulation type specified by the information signal. Alternatively, or additionally, in some embodiments resampling the signal based on the data rate and modulation type specified by the information signal may allow for the interfering or overlapping source signal to be estimated, inverted, and reapplied to the combined waveform for cancellation, yielding the desired waveform. These examples are not limiting, and it will be appreciated that other embodiments may be utilized for generating estimated waveforms.

With the estimated waveforms 214a, 214b, satellite 212 can extract the source signals from the combined source signal 209. As shown in FIG. 6, a signal cancellation module 215 may be provided that applies signal cancellation methods to the received combined source signal 209 and the estimated waveforms 214a, 214b to extract and isolate modulated source signals 216a, 216b. For example, the signal cancellation module 215 may apply complex cancellation methods. In the embodiment of FIG. 6, modulated source signal 204a may be isolated 216a using estimated waveforms 214b, and modulated source signal, 204b may be isolated 216b using estimated waveforms 214a.

In some embodiments, each isolated source signals 216a, 216b (corresponding to modulated source signals 204a, 204b) may be filtered 217a, 217b at satellite 212. Further, as part of the filtering stage or as a subsequent step, demodulation may be performed on the signals (i.e., the reverse of the further modulation method applied to the signals). In some aspects, the filtering and demodulation may be performed by the set of DSPs at satellite 212. Thereafter, satellite 212 may downlink, with one or more downlink Tx antennas, the plurality of source signals to one or more user ground terminals or other ground sites (i.e., the intended recipients of the source signals).

Figure 7A:
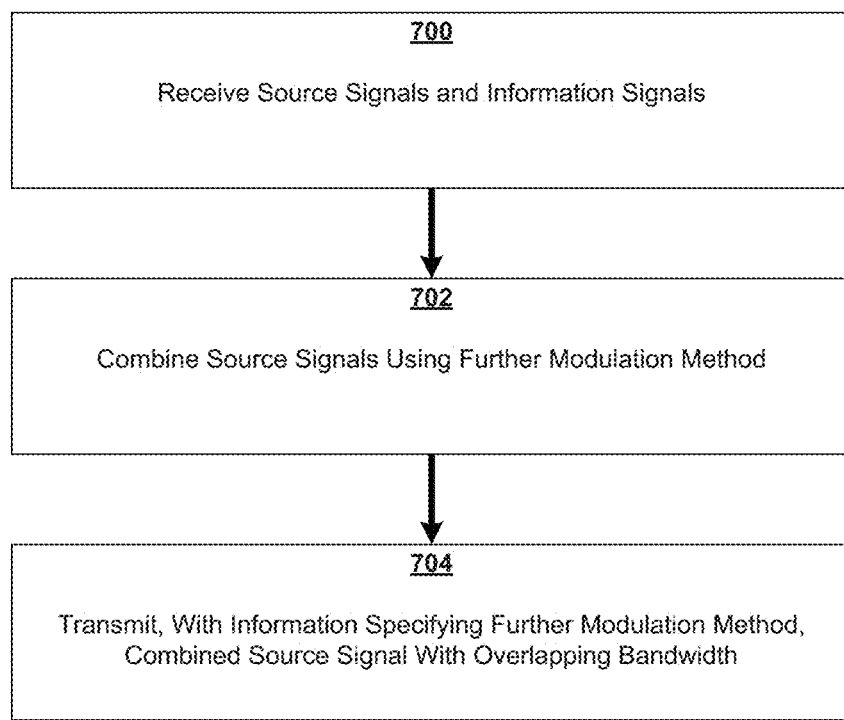
FIGS. 7A and 7B illustrate methods consistent with embodiments of the present disclosure.

FIG. 7A illustrates a flowchart of an example method of combining source signals into an overlapping bandwidth, consistent with the present disclosure. The example method of FIG. 7A may be applied to generate a combined source signal at a satellite (for a downlink transmission or a gateway ground station (for a uplink transmission).

At step 700, a plurality of source signals and a plurality of corresponding information signals are received. In some embodiments, the source signals and information signals are received, via uplink, by one or more receiving antennas on-board a satellite. For example, the plurality of source signals and corresponding information signals may be transmitted from two or more user ground terminals via transmission antennas to the receiving antennas of a satellite. As a further example, the source and information signals may be transmitted from one or more gateway ground stations to a satellite.

In other embodiments, the plurality of source signals and information signals are received at a gateway ground station. For example, the source signals and information signals may be received at a gateway ground station by one or more ports. In such cases, the source and information signals may be routed from two more user ground terminals via, for example, a transmission path (e.g., comprising of coaxial cables, waveguides, filters, and amplifiers) leading to the gateway ground station. The transmission path may comprise cellular and/or wired communication networks.

In some embodiments, the received information signals include information relating to a source modulation method of the corresponding source signal. The plurality of received information signals may also include information specifying a secondary or further method of modulation applied to the corresponding source signal before it was combined with other source signal(s) in an overlapping bandwidth.

Referring again to FIG. 7A, at step 702, the received source signals may be combined to form a combined source signal. A secondary or further modulation method may be applied to the source signals before they are combined. As part of step 702, the source signals may be combined into an overlapping bandwidth. The signals may also be further combined using a set of digital signal processors (DSPs). In some embodiments, the DSPs are located on-board a satellite. In other embodiments, the DSPs are located at a gateway ground station.

At step 704, the combined source signal and information specifying the secondary or further modulation method are transmitted (e.g., from a satellite (downlink) or a gateway ground station (uplink)). In some embodiments, the transmission may be from antenna(s) on a satellite for downlink to receiving antenna(s) at a gateway ground station. In other embodiments, the transmission may be from antenna(s) at a gateway ground station for uplink to receiving antenna(s) on-board a satellite. In either case, the combined source signal and information is transmitted on an overlapping bandwidth, thus increasing spectral efficiency. Also, as disclosed herein, the information specifying the secondary or further modulation method may be transmitted as part of a combined information signal.

Figure 7B:
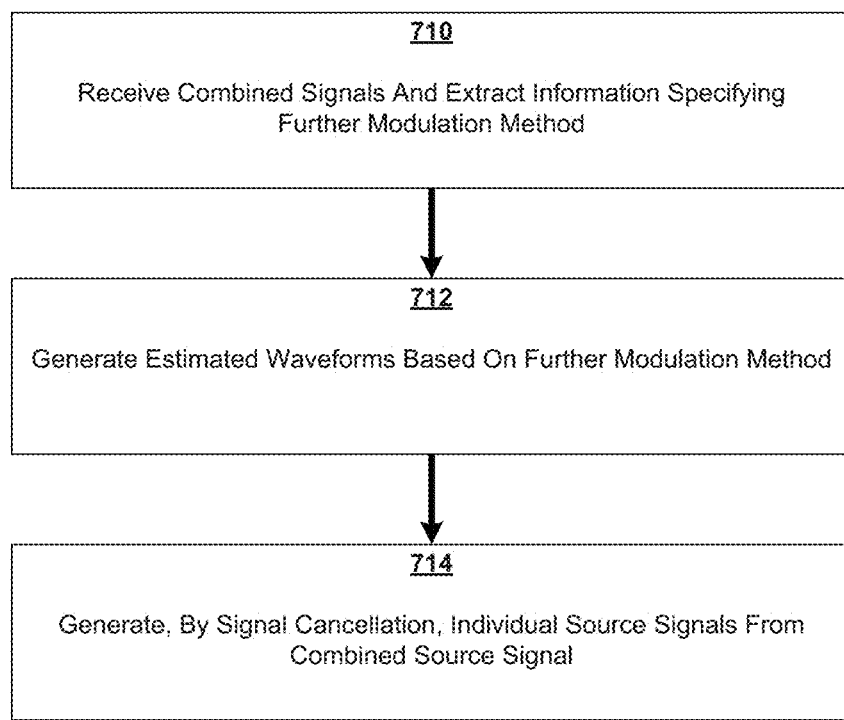

FIG. 7B illustrates a flowchart of an example method for receiving and separating a combined source signal into individual source signals with non-overlapping bandwidth for transmission, consistent with the present disclosure. The method of FIG. 7B can be used in combination with (and subsequent to) the method of FIG. 7A, described above. The example method of FIG. 7B and related processing of the combined source signal may be performed at a gateway ground station (that has received the combined signal as part of a downlink transmission) or at a satellite (that has received the combined signal as part of an uplink transmission).

At step 710, the combined source signal is received, along with information specifying a secondary or further modulation method applied to the source signals before they were combined. In some embodiments, the combined source signal is received via an uplink to receiving antenna(s) of a satellite. In other embodiments, the combined source signal is received via a downlink from a satellite to receiving antenna(s) of a gateway ground station. In addition to receiving the combined source signal, a combined information signal may be received. As disclosed herein, the combined information signal may include information specifying the secondary or further modulation method applied to the source signals before they were combined.

In some embodiments, the information specifying the further modulation method is extracted from the combined information signal, which also includes other information related to the individual source signals in the combined source signal. In some embodiments, a combined information signal is not utilized and instead the information specifying the further modulation method may be extracted from one or more received information signals corresponding to the individual source signals in the combined source signal.

In some embodiments, information specifying the further modulation method is extracted by separating a received combined information signal using a predetermined demodulation method and analyzing the information in the plurality of information signal using a set of DSPs. In some embodiments, extracting information specifying the further modulation method comprises analyzing information in a combined information signal, or in a plurality of information signals, whichever is received, using a set of DSPs.

Step 712 comprises generating estimated waveforms based on the information specifying the further modulation method (extracted in step 710). In some embodiments, signal extraction module extracts, from the combined information signal 108, the information specifying the secondary or further modulation method, and generates, based on the further modulation method, the estimated waveforms corresponding to the modulated source signals that are combined into the combined source signal.

As further shown in FIG. 7B, step 714 comprises generating, by signal cancellation, the individual source signals from the combined source signal. For example, the signals may be generated by applying the estimated waveforms to the combined source signal and using complex cancellation methods. In some embodiments, each isolated source signal (corresponding to modulated source signals in the combined source signal) may be filtered, either at a satellite or a gateway ground station, depending on where the processing is performed. Further, as part of a filtering stage or as a subsequent step, demodulation may be performed on the signals (i.e., the reverse of the further modulation method applied to the signals). In some aspects, the filtering and demodulation may be performed by a set of DSPs at the satellite or gateway ground station. Thereafter, the signals may be routed, with a terrestrial network or similar communication equipment, to one or more user ground terminals or other ground sites (i.e., the intended recipients of the source signals).

Figure 8:
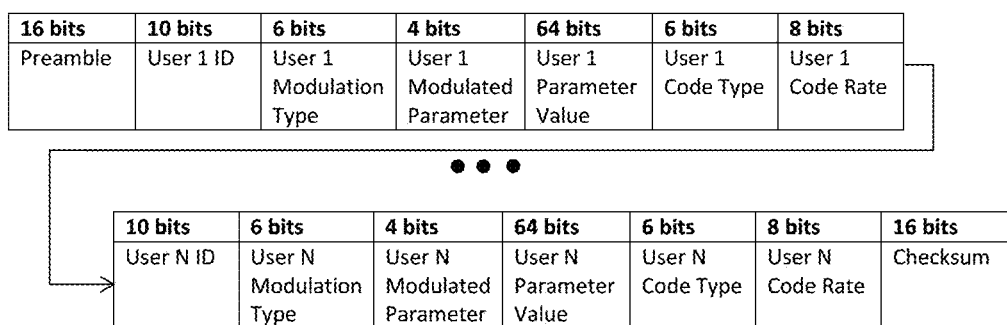
FIG. 8 illustrates the frame structure and contents of an example information signal.
Figure 9:
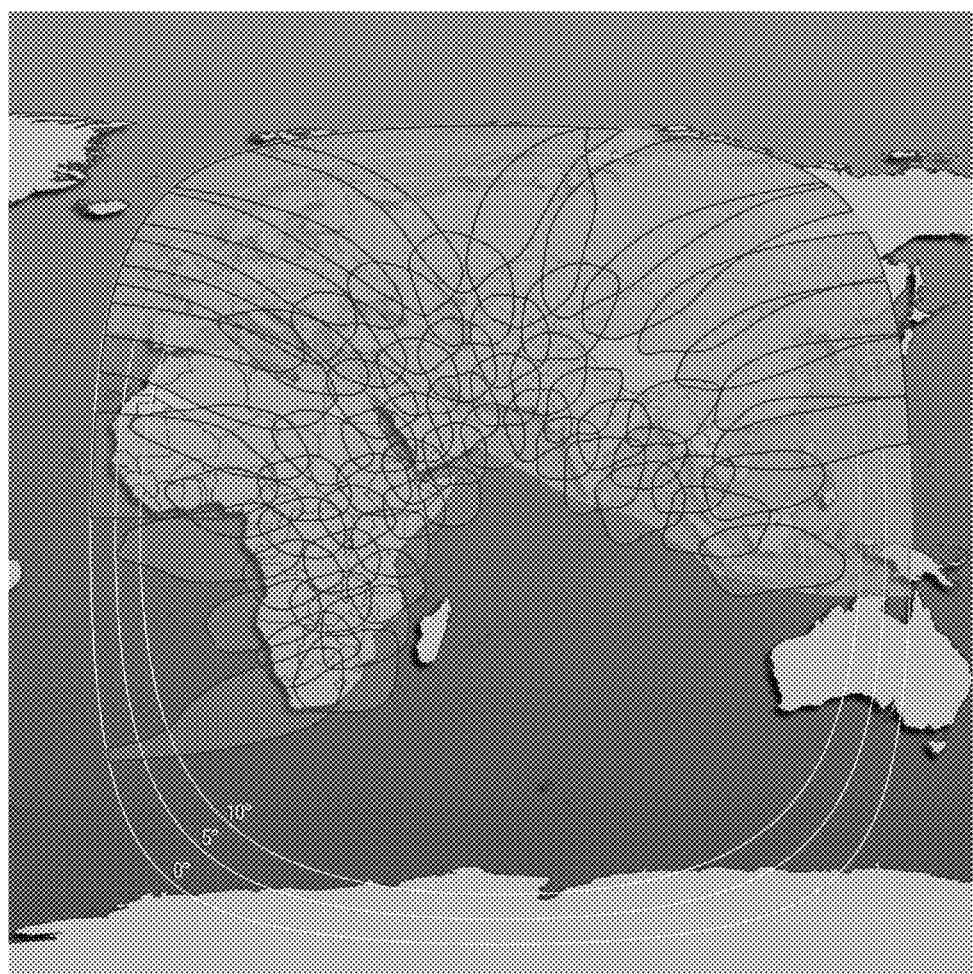
FIGS. 9 and 10 provide examples of satellite beam coverage areas.
Figure 10:
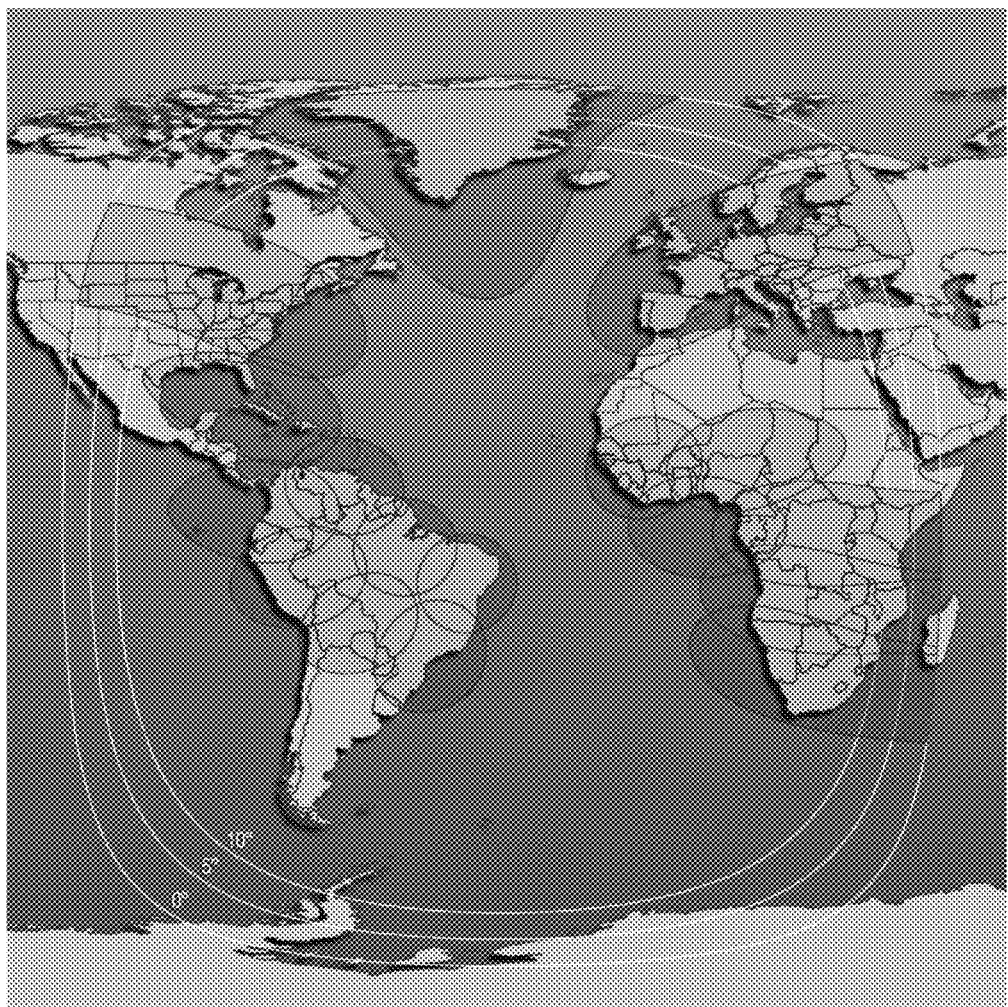

FIG. 8 illustrates the frame structure and contents of an example combined information signal 801. The combined information signal 801 may be employed with embodiments of the present disclosure, including that described above. As disclosed herein, a combined information signal may provide information regarding the source modulation method and other details (error correction code type, code ratio, etc) related to each source signal, as well as the further modulation method(s) applied to the sources signals before they are combined into a combined source signal. The combined information signal may be generated based on the source information signals and transmitted with the combined source signal (e.g., in a related sub-channel).

The combined information signal contains all of the information needed to generate the estimated waveforms to isolate the source signals of interest (i.e., each source or user signal) from the combined source signal. The combined information signal can be routed (controlled via ground command) to the section of the DSP(s) that process users that are combined in overlapping frequency for separation.

In some embodiments, the combined information signal contains information that informs an extraction module or similar module of the DSP(s) about the composition (source modulation type, code rate, etc.) of each source signal and the further modulations (e.g., frequency offset, phase offset, shaping factor, phase, amplitude, and/or group delay shifts) added to the signal to produce the combined source signal. Based on the contents of the combined information signal, the DSP(s) are able to generate estimated waveforms corresponding to each of the source signals which is used in a signal cancellation module or similar module of the DSP(s) to respectively cancel out other source signal(s), leaving each source signal of interest remaining intact.

As noted above, FIG. 8 illustrates the frame structure and contents of the combined information signal 801. It will be appreciated from this disclosure that other forms and arrangements are possible and that the example shown in FIG. 8 is merely for purposes of illustration. In general, combined information signal 801 may be composed of a sequence of bits in a frame structure. As noted above, combined information signal 801 can be used to aid in the separation of source signals (corresponding to User 1 to User N in FIG. 8) that overlap in frequency.

As shown in the example embodiment of FIG. 8, a Preamble is provided as part of combined information signal 801. The Preamble may consist of a predetermined number of bits (e.g., 16 bits) that provides good correlation properties to enhance detection of the information signal during signal processing. In some embodiments, the Preamble includes a unique bit sequence to mark the start of the frame.

The frame structure of combined information signal 801 also includes information related to each of the source signals that are combined for transmission (uplink or downlink). In FIG. 8, information related to the source signals of User 1 to User N is shown, where N can any number greater than 1 (i.e., a minimum of two is required). It will be appreciated that the complexity of the processing increases with the number of source or user signals. In some embodiments, the number of combined source signals is 2. In other embodiments, N equals 3, 4, or 5. The level of processing complexity that can be supported will depend on the set of DSP(s) provided on-board the satellite or at the ground stations.

For each User 1 to User N, the example combined information signal 801 includes a User ID field and a Modulation Type, a Modulated Parameter, a Parameter Value, a Code Type, and a Code Rate that follow this field. The User ID comprises a unique sequence to identify the user. In the example embodiment of FIG. 8, the User ID filed is 10 bits. By way of example, the sizes of the other fields are: Modulation Type (6 bits), Modulated Parameter (4 bits), Parameter Value (64 bits), Code Type (6 bits), and Code Rate (8 bits), as further shown in FIG. 8.

The Modulation Type may indicate the type of source modulation used for the corresponding source signal (e.g., QPSK, 16-QAM, 64 APSK, etc.). The Modulated Parameter may provide information regarding the secondary or further modulation method(s) (e.g., amplitude shift, phase shift, group delay, spectral inversion, and/or pseudo-noise coding). The Parameter Value may provide further information related to the further modulation method, such as the quantified adjustment of the Modulated Parameter (e.g., a 90 degree phase shift, in the case of phase shift to the source signal). The Modulated Parameter and Parameter Value may be used by the DSP(s) to aid in the separation of the overlapping signals.

As disclosed herein, the secondary or further modulation may be predetermined or programmed in advance. Also, each source signal may be further modulated in advance by the DSP(s) before they are combined. In some embodiments, the predetermined modulation method is the same for all source signals to be combined. In other embodiments, the modulation method (as reflected by the Modulated Parameter and Parameter Value) varies with respect to the source signals to be combined. In either case, as reflected in the example of FIG. 8, the combined information signal includes not only the underlying source modulation for each source signal, but also the secondary or further modulation applied to each source signal.

Referring again to FIG. 8, the information for each source or user signal also includes a Code Type and Code Rate. The Code Type may provide information related to the type of error correction employed for the source signal, such as a Forward Error Correction (FEC) code (e.g., LDPC, Reed-Solomon, Convolutional, etc.). The Code Rate may provide information that indicates the ratio of information bits to error correction bits (e.g., 7/8).

Other information may be provided as part of combined information signal 801, such as a Checksum. This field (16 bits in the example of FIG. 8) may provide an integer quantity that is the output of an error correction algorithm. For example, the Checksum field may provide the output integer value of a CRC (Cyclic Redundancy Check) algorithm used to determine if a bit error has occurred in the received frame.

Figure 11:
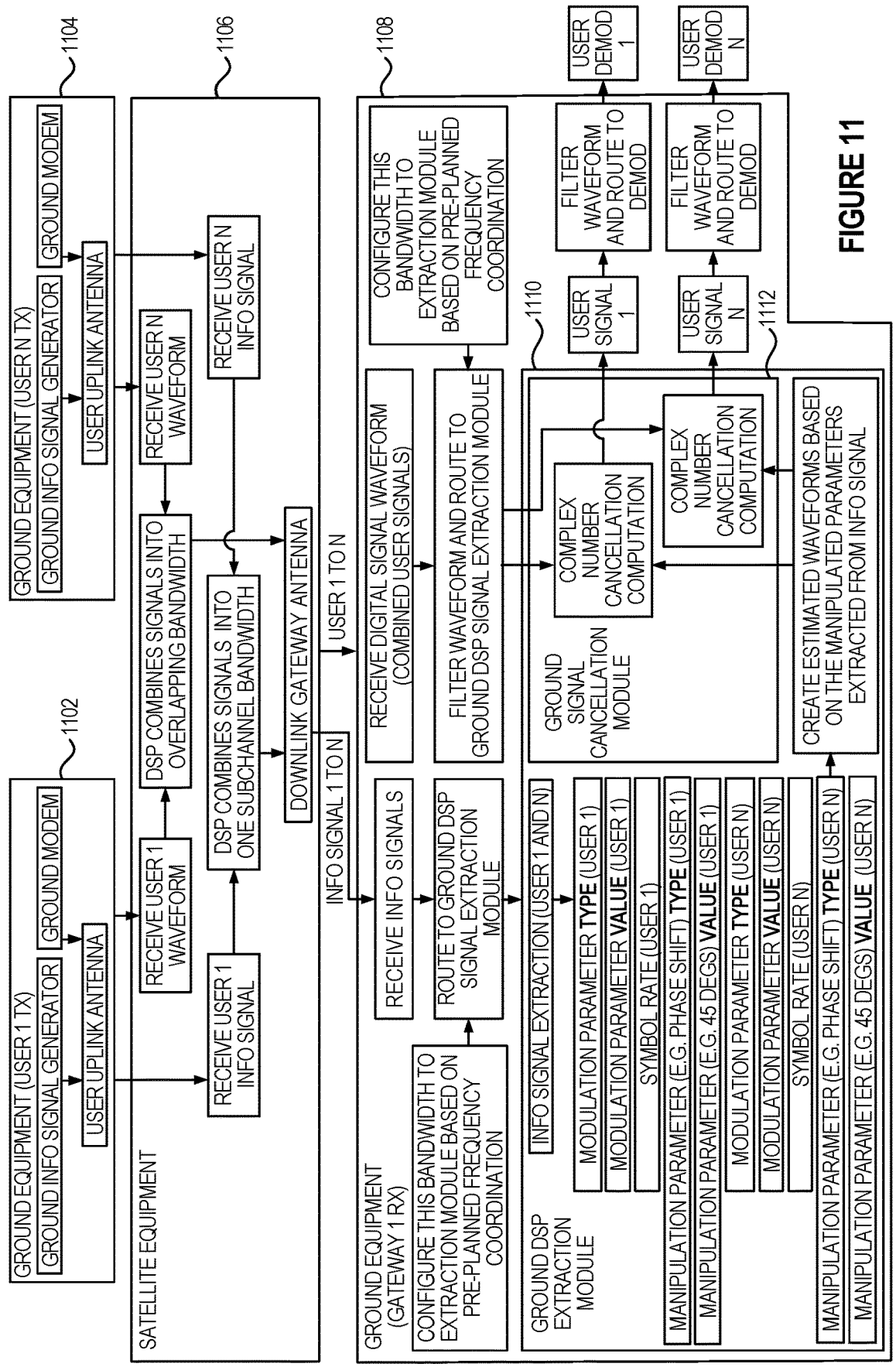
FIG. 11 illustrates a further example satellite communications system for embodiments where signals are separately transmitted on uplink but combined on downlink.
Figure 12:
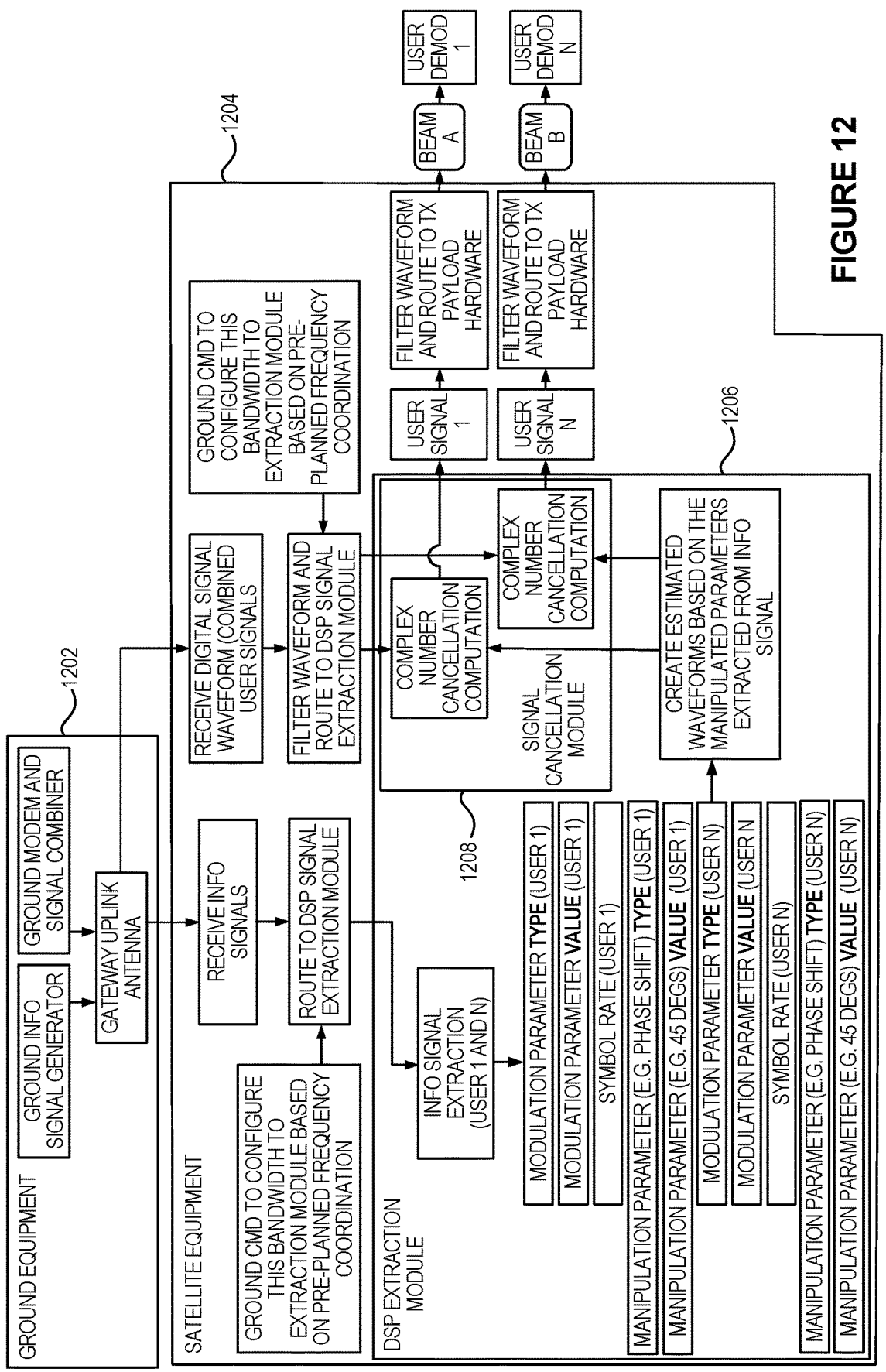
FIG. 12 illustrates a further example satellite communications system for embodiments where signals are combined on uplink but separately transmitted on downlink.

FIGS. 11 and 12 illustrate further examples of satellite communications systems for implementing embodiments of the invention, including the above embodiments for FIGS. 7A and 7B. FIG. 11 illustrates an example satellite communications system for embodiments where signals are separately transmitted on uplink but combined on downlink. In FIG. 11, the system elements are shown along with the steps or operations that are performed by the system elements. As shown in FIG. 11, a plurality of ground equipment stations 1102, 1104 may be provided, wherein each ground equipment station includes a ground info signal generator, a ground modem, and a user uplink antenna. A plurality of info signals and users signals/waveforms are transmitted via the uplink antenna to satellite equipment 1106 on board a satellite. A DSP on board the satellite may combine the plurality of info signals into one subchannel bandwidth. Further, the DSP may combine the plurality of user signals/waveforms into an overlapping bandwidth within the channel. A downlink gateway antenna may transmit the combined info signal and the combined user signals to ground equipment 1108. A ground DSP extraction module 1110 in the ground equipment may separate info signals and extracts parameters (e.g., modulation parameters). The DSP extraction module 110 may also generate estimated waveforms based on the parameters. In some embodiments, using complex cancellation computation methods, a ground signal cancellation module 1112 separates the combined user signal into two or more user signals. Separated user signals may be routed to users on the ground, consistent with the disclosed embodiments.

FIG. 12 illustrates a further example satellite communications system for embodiments where signals are combined on uplink but separately transmitted on downlink. In FIG. 12, the system elements are shown along with the steps or operations that are performed by the system elements. As shown in FIG. 12, ground equipment 1202 is provided that may include a ground info signal generator, a ground model signal combiner, and a gateway uplink antenna. The ground signal generator may generate a combined info signal, consistent with the disclosed embodiments. Further, the ground modem signal combiner may generate a combined user signal, consistent with the disclosed embodiments. The combined info signal and combined user signal may be transmitted to satellite equipment 1204 on board a satellite via a gateway uplink antenna. A DSP extraction module 1206 on board the satellite may separate info signals and extract parameters (e.g., modulation parameters). Further, the DSP extraction module 1206 may generate estimated waveforms based on the parameters. In some embodiments, using complex cancellation computation methods, a signal cancellation module 1208 separates the combined user signal into two or more user signals. Separated user signals may be downlinked via a spot beam, for example and demodulated on the ground.

The following table indicates the increased spectral efficiency and throughput that can be achieved by combining two source signals in an overlapping bandwidth, consistent with the present disclosure. The table is provided for illustration and is not exhaustive of the advantageous of the present disclosure.

TABLE 1

Examples of Data Rates, Modulations, and Code Rates

| Modulation & Coding Receive Antenna | Spectral Efficiency with Traditional Modems (bps/Hz) | Throughput for 1 MHz Bandwidth with Traditional Modems (Mbps) | Spectral Efficiency Improvement with Overlapping Source Signals (bps/Hz) | Throughput for 1 MHz Bandwidth with Overlapping Source Signals (Mbps) |
|---|---|---|---|---|
| QPSK 39/50 FEC-0.83 m | 1.30 | 1.30 | 2.60 | 2.60 |
| 16QAM 7/8 FEC-2.4 m | 2.67 | 2.67 | 5.33 | 5.33 |
| 16APSK 0.6244 FEC-1.2 m | 2.08 | 2.08 | 4.16 | 4.16 |
| 32APSK 29/40 FEC-2.4 m | 3.02 | 3.02 | 6.04 | 6.04 |
| 64-APSK 144/180 FEC-2.4 m | 3.79 | 3.79 | 7.58 | 7.58 |
| 256-APSK 29/45 FEC-1.8 m | 4.73 | 4.73 | 9.46 | 9.46 |
| 256-APSK 3/4 FEC-3.8 m | 5.44 | 5.44 | 10.87 | 10.87 |

Figure 13:
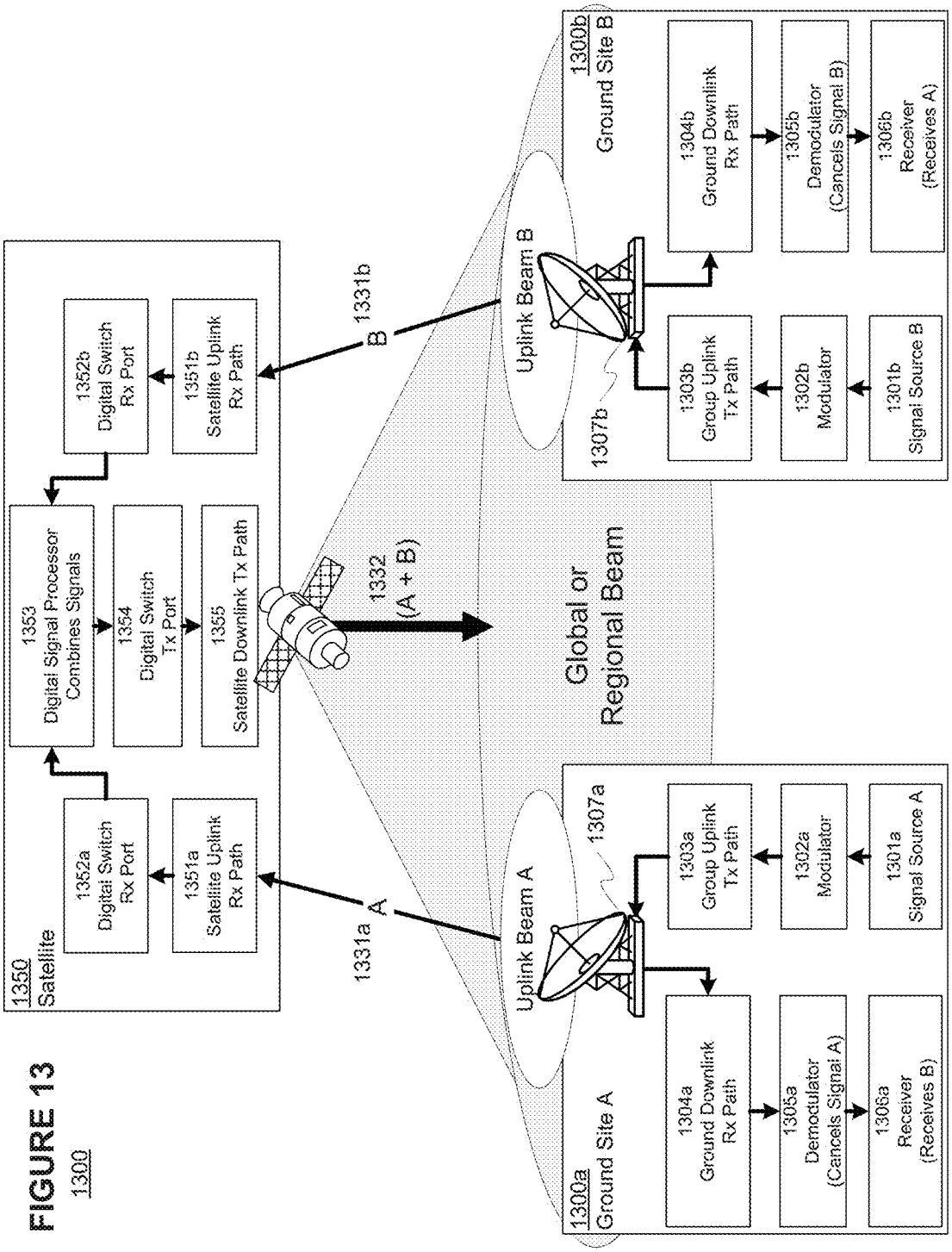
FIG. 13 illustrates an example satellite communications system for embodiments where signals are separately transmitted on uplink but combined on downlink.

FIG. 13 illustrates, in accordance with the present disclosure, an example satellite communications system 1300 for embodiments where source signals are separately transmitted on uplink, but combined on downlink. Traditional methods of two-carrier channel sharing involve the sharing of a common uplink and downlink channel. The example of FIG. 13 is uniquely distinct from the traditional channel sharing in that the uplink channel bandwidths to the satellite are not shared or overlapping in frequency, beam, and polarization. A digital signal processor is required to alter and then combine the signals to enable bandwidth efficiency on the downlink spectrum and carrier extraction on the ground.

For purposes of illustration in FIG. 13, there are separate uplink transmissions of a first source signal (signal A) 1301a from a first ground site 1300a (Ground Site A) to a satellite 1350 and from a second source signal (signal B) 1301b from a second ground site 1300b (Ground Site B) to a satellite 1350. Further, for purposes of illustration, a downlink transmission comprises combined source signals (signal (A+B)) downlinked via a common global or regional beam 1332 to the separate ground sites 1300a, 1300b.

It will be appreciated that more than one satellite may be involved in the transmission of the signals. For example, each source signal may be uplinked from ground sites to distinct satellites, then crosslinked to other satellites until ultimately arriving at a satellite, where the signals are combined. As a further example, the combined source signal may be crosslinked to other satellites prior to downlink to the ground.

Referring again to FIG. 13, two ground site terminals 1300a, 1300b can send each other information via separate uplink spot beams 1331a, 1331b and a common downlink global or regional beam 1332 using the same downlink spectrum. In some embodiments, each signal source is a representation of any arbitrary source of electronically-transmitted information via a communication medium. The source signals (A, B) may arrive or originate at Ground Site A 1301*a* and Ground Site B 1301*b*. The sources for the signals in the example of FIG. 13 may be located at the ground sites, but it will be appreciated that the signal sources may originate and be modulated anywhere outside of the ground sites 1300*a*, 1300*b* and then transmitted to the ground sites.

In some embodiments, prior to uplink transmission, the signal source is provided to a modulator 1302*a*, 1302*b* at the respective ground sites 1300*a*, 1300*b* for implementing modulation and coding schemes. At the ground sites, one or both of Signal A 1301*a* and Signal B 1301*b* may be modulated by modulators 1302*a*, 1302*b* using one or more further modulation methods (e.g., amplitude shift, phase shift, group delay, spectral inversion, and/or pseudo-noise coding). Both Signal A 1301*a* and Signal B 1301*b* exit their respective modems similar communication equipment and traverse an uplink transmission path 1303*a*, 1303*b* typically consisting of coaxial cables, waveguides, filters, and amplifiers leading to a transmitting antenna 1307*a*, 1307*b* for uplink transmission to the satellite. In the example of FIG. 13, Signal A 1301*a* is uplinked to satellite 1350 by antenna 1307*a* over a first pathway and Signal B 1301*b* is uplinked to satellite 1350 by antenna 1307*b* over a second pathway. In this example, Signal A 1301*a* and Signal B 1301*b* are transmitted to the satellite 1350 via orthogonal pathways comprising, for example, separate frequencies, beams, or polarizations.

In some embodiments, the source modulation method applied to source signals by modulators 1302*a*, 1302*b* comprises a Digital Video Broadcasting (DVB) standard. For example, the method of source modulation may be DVB-S2 or DVB-S2X.

In some embodiments, the method of modulation applied to source signals by modulators 1302*a*, 1302*b* comprises at least one Amplitude Phase Shift Key (APSK), Frequency Division Multiple Access (FDMA), Time Division Multiple Access (TDMA), Code Division Multiple Access (CDMA), and/or a multiplexing method. In some embodiments, one or more similar modulation methods may be used for purposes of applying the further modulation to the source signals. In the embodiment of FIG. 13, the satellite uplink paths 1351*a*, 1351*b* are not limited to, but typically composed of, one or more receive (Rx) antennas, a low-noise amplifier, a filter, a digital down converter, and miscellaneous switches, cables, and waveguides. Received source signals may or may not share some common satellite components as they are routed from their respective Rx antennas to their respective DSP ports on-board satellite 1352*a*, 1352*b*. One or more DSPs 1353 may alter and combine the signals to enable greater bandwidth efficiency on downlink 1332. The DSP 1353 may digitize analog signals using an Analog-to-Digital Converter (ADC). These digitalized signals may be filtered and may be routed to either an application specific integrated circuit (ASIC) or field programmable gate array (FPGA) in which the DSP 1353 may apply transforms and manipulations to further modulate the signals (e.g., by amplitude shift, phase shift, group delay, and/or spectral inversion). Additionally or alternately, the DSP 1353 apply Pseudorandom Noise (PN) coding. As previously discussed, the DSP 1353 of satellite 1353 combines Signal A and Signal B such that they overlap in frequency. Embodiments may comprise either or both regenerative and non-regenerative digital signal processor implementations.

In some embodiments, the transform applied to combine Signals A and Signal B into a combined Signal (A+B) allows the component signals to be later separated by, for example, applying an inverse transform, signal cancellation, or a signal identification method on the ground equipment 1300*a* and 1300*b* that ultimately receives the combine the combined Signal (A+B).

In the embodiment of FIG. 13, the combined Signal (A+B) is transmitted out of the DSP port 1354 to the satellite Tx path 1355 for transmission to both ground sites 1300*a*, 1300*b* via a downlink global or regional beam 1332. The satellite downlink path 1355 is not limited to, but may be comprised of, a transmit antenna, a traveling wave tube amplifier, filters, an up-converter, and miscellaneous switches, cables, and waveguides.

In the embodiment of FIG. 13, both Ground Site A 1300*a* and Ground Site B 1300*b* receive the combined signal at a corresponding receiver antenna 1307*a*, 1307*b*. For purposes of illustration, the downlink receiver antennas at each ground site are the same as the uplink transmission antennas 1307*a*, 1307*b*, but it will be appreciated that a separate receiver and a separate transmission antenna may be used at each ground site, which may be co-located at their respective ground sites or may be distributed or remotely located. In some aspects of these embodiments, the received combined Signal (A+B) at each site are routed via ground downlink pathways, 1304*a*, 1304*b*, to demodulators 1305*a*, 1305*b* at each site that apply the inverse of the transform previously applied on the satellite to extract the desired signal. Ground Site A extracts and receives Signal B 1306*a* and Ground Site B extracts and receives Signal A 1306*b* from the combined signal. In some embodiments, the respective demodulators 1305*a*, 1305*b* apply inverse transforms, signal cancellation, or a signal identification method to extract out the desired signal from the combined signal.

The foregoing description and embodiments have been presented for purposes of illustration. It is not exhaustive and, as will be appreciated, the claimed invention is not limited to precise forms or embodiments disclosed herein. Modifications and adaptations of the embodiments will be apparent from consideration of the specification and practice of the disclosed embodiments. For example, the described implementations have been described with reference to specific components in a satellite communication system. As will be appreciated, the components can be arranged in various ways and implemented with any suitable combination of hardware, firmware, and/or software, as applicable. Furthermore, the disclosed systems and methods may be modified and the components or steps may be rearranged, substituted, or otherwise changed without departing from the scope of the disclosure and the below claims.

Computer programs, program modules, and code based on the written description of the present disclosure, such as those used by the digital signal processors of the disclosed embodiments, are readily within the purview of a software or system developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed:

1. A method for use in a satellite communication system, comprising:
   receiving, at a ground site terminal, a first source signal;
   transmitting, from the ground site terminal, a satellite uplink beam based on the first source signal;
   receiving, at the ground site terminal, a satellite downlink beam comprising a combined signal, the combined signal comprising a first signal based on the source signal and a second signal based on a second source signal, the first signal and the second signal having overlapping frequency; and
   demodulating the combined signal to generate the second source signal, the demodulating comprising applying a method of cancellation based on the first source signal.

2. The method of claim 1, further comprising modulating the first source signal, wherein the satellite uplink beam is based on the modulated first source signal.

3. The method of claim 1, wherein:
   transmitting the satellite uplink beam comprises transmitting the satellite uplink beam to a first satellite; and
   receiving the satellite downlink beam comprises receiving the satellite downlink beam from a second satellite that is different from the first satellite.

4. The method of claim 1, wherein:
   transmitting the satellite uplink beam comprises transmitting the satellite uplink beam to a first satellite among a plurality of satellites; and
   receiving the satellite downlink beam comprises receiving the satellite downlink beam from the first satellite.

5. The method of claim 1, wherein the satellite downlink beam is a global beam.

6. The method of claim 1, wherein the satellite downlink beam is a regional beam.

7. The method of claim 1, wherein demodulating the combined signal comprises applying at least one of an inverse transform method, a signal cancellation method, or a signal identification method to the combined signal.

8. The method of claim 1, further comprising using different antennas of the ground site terminal for transmitting the uplink beam and receiving the downlink beam.

9. The method of claim 1, wherein:
   the satellite uplink beam is a first satellite uplink beam;
   the ground site terminal is a first ground site terminal; and
   the second source signal is based on a second uplink beam transmitted by a second ground site terminal that is different from the first ground site terminal.

10. The method of claim 1, wherein the satellite uplink and downlink beams are created using at least one digital signal processor.

11. The method of claim 1, wherein the satellite uplink beam is created based on a position of a satellite and an assigned frequency.

12. The method of claim 1, wherein the satellite uplink and downlink beams are created using at least one of a regenerative digital signal processor or a non-regenerative digital signal processor.

13. A system for satellite communications, the system comprising one or more digital signal processors at a ground site terminal, the one or more digital signal processors being configured to perform operations comprising:
   receiving a first source signal;
   transmitting a satellite uplink beam based on the first source signal;
   receiving a satellite downlink beam comprising a combined signal, the combined signal comprising a first signal based on the source signal and a second signal based on a second source signal, the first signal and the second signal having overlapping frequency; and
   demodulating the combined signal to generate the second source signal, the demodulating comprising applying a method of cancellation based on the first source signal.

14. The system of claim 13, the operations further comprising modulating the first source signal, wherein the satellite uplink beam is based on the modulated first source signal.

15. The system of claim 13, wherein:
   transmitting the satellite uplink beam comprises transmitting the satellite uplink beam to a first satellite; and
   receiving the satellite downlink beam comprises receiving the satellite downlink beam from a second satellite that is different from the first satellite.

16. The system of claim 13, wherein:
   transmitting the satellite uplink beam comprises transmitting the satellite uplink beam to a first satellite among a plurality of satellites; and
   receiving the satellite downlink beam comprises receiving the satellite downlink beam from the first satellite.

17. The system of claim 13, wherein the satellite downlink beam is a global beam.

18. The system of claim 13, wherein the satellite downlink beam is a regional beam.

19. The system of claim 13, wherein demodulating the combined signal comprises applying at least one of an inverse transform method, a signal cancellation method, or a signal identification method to the combined signal.

20. The system of claim 13, wherein the operations further comprise using different antennas of the ground site terminal for transmitting the uplink beam and receiving the downlink beam.

21. The system of claim 13, wherein:
the satellite uplink beam is a first satellite uplink beam;
the ground site terminal is a first ground site terminal; and
the second source signal is based on a second uplink beam transmitted by a second ground site terminal that is different from the first ground site terminal.

22. A non-transitory computer-readable medium storing instructions executable by one or more hardware processors to carry out operations comprising:
receiving, at a ground site terminal, a first source signal;
transmitting, from the ground site terminal, a satellite uplink beam based on the first source signal;
receiving, at the ground site terminal, a satellite downlink beam comprising a combined signal, the combined signal comprising a first signal based on the source signal and a second signal based on a second source signal, the first signal and the second signal having overlapping frequency; and
demodulating the combined signal to generate the second source signal, the demodulating comprising applying a method of cancellation based on the first source signal.

23. The non-transitory computer-readable medium of claim 22, wherein:
the satellite uplink beam is a first satellite uplink beam;
the ground site terminal is a first ground site terminal; and
the second source signal is based on a second uplink beam transmitted by a second ground site terminal that is different from the first ground site terminal.

* * * * *